United States Patent [19]

Hirata et al.

[11] Patent Number: 5,666,178
[45] Date of Patent: Sep. 9, 1997

[54] LIQUID CRYSTAL DISPLAY APPARATUS HAVING PLURAL REGIONS OF DIFFERENT ALIGNING CONDITIONS AND METHOD FOR PRODUCING THE SAME

[75] Inventors: Mitsuaki Hirata, Tenri; Shigeaki Mizushima, Ikoma; Kazuyuki Aburazaki, Tenri; Noriko Watanabe, Nara; Hiroko Iwagoe, Yamatokoriyama; Seiji Makino, Tenri; Tomoko Okamura, Funabashi, all of Japan

[73] Assignee: Sharp Kabushiki Kaisha, Osaka, Japan

[21] Appl. No.: 278,950

[22] Filed: Jul. 22, 1994

[30] Foreign Application Priority Data

| Jul. 30, 1993 | [JP] | Japan | 5-190499 |
| Aug. 31, 1993 | [JP] | Japan | 5-216697 |
| Aug. 31, 1993 | [JP] | Japan | 5-216698 |
| Aug. 31, 1993 | [JP] | Japan | 5-216699 |

[51] Int. Cl.$^6$ .......................... G02F 1/1337; G02F 1/141
[52] U.S. Cl. .......................... 349/136; 349/129
[58] Field of Search .......................... 359/75, 76; 349/136, 349/129

[56] References Cited

U.S. PATENT DOCUMENTS

| 3,854,793 | 12/1974 | Kahn | 350/160 |
| 3,947,185 | 3/1976 | Maezawa | 350/160 |
| 3,967,883 | 7/1976 | Meyerhofer et al. | 359/76 |
| 4,247,174 | 1/1981 | Walter | 350/340 |
| 4,252,415 | 2/1981 | Klein et al. | 359/76 |
| 4,840,460 | 6/1989 | Bernot et al. | 350/333 |
| 4,878,742 | 11/1989 | Ohkubo et al. | 359/75 |
| 4,930,876 | 6/1990 | Suzuki et al. | 350/336 |
| 5,071,228 | 12/1991 | Waldmann et al. | 359/63 |
| 5,073,294 | 12/1991 | Shannon et al. | 252/299.01 |
| 5,172,255 | 12/1992 | Brosig et al. | 359/76 |
| 5,189,540 | 2/1993 | Nakamura et al. | 359/76 |
| 5,198,917 | 3/1993 | Togashi | 359/76 |
| 5,223,963 | 6/1993 | Okada et al. | 359/78 |
| 5,231,039 | 7/1993 | Sakano et al. | 437/40 |
| 5,280,375 | 1/1994 | Tsuda et al. | 359/76 |
| 5,303,076 | 4/1994 | Okada et al. | 359/78 |
| 5,309,264 | 5/1994 | Lien et al. | 359/87 |

(List continued on next page.)

FOREIGN PATENT DOCUMENTS

| 0421190 A3 | 9/1990 | European Pat. Off. . |
| 0549283 A2 | 6/1993 | European Pat. Off. . |
| 0613037 A2 | 8/1994 | European Pat. Off. . |
| 56-146119 | 11/1981 | Japan . |
| 60-147722 | 8/1985 | Japan . |

(List continued on next page.)

OTHER PUBLICATIONS

Yang, K.H., "Two–Domain 80–Twisted Nematic Liquid Crystal Display for Grayscale Applications", Japanese Journal of Applied Physics, Letters, vol. 31, No. 11B, Nov. 1992, Tokyo, Japan, pp. L1603–1605.
Patent Abstracts of Japan, vol. 009, No. 243 (P–392) 30 Sep. 1985 & JP–A–60095423 (Citizen Tokei KK) 28 May 1985.
Patent Abstracts of Japan, vol. 007, No. 256 (P–236) 15 Nov. 1983 & JP–A–58139124 (Tokyo Shibaura Denki KK) 18 Aug. 1983.

(List continued on next page.)

*Primary Examiner*—William L. Sikes
*Assistant Examiner*—Charles Miller
*Attorney, Agent, or Firm*—Nixon & Vanderhye P.C.

[57] ABSTRACT

A liquid crystal display apparatus of the invention includes a pair of substrates and a liquid crystal layer sandwiched between the pair of substrates with alignment films formed at interfaces between the liquid crystal layer and the respective substrates. The alignment films regulate aligning conditions of liquid crystal in the liquid crystal layer. In the liquid crystal display apparatus, the liquid crystal layer includes two or more liquid crystal layer regions of different aligning conditions, and at least one of the alignment films has surface tensions which are different from each other in surface regions thereof corresponding to the respective liquid crystal layer regions of different aligning conditions.

34 Claims, 23 Drawing Sheets

U.S. PATENT DOCUMENTS

| | | | |
|---|---|---|---|
| 5,321,537 | 6/1994 | Okada et al. | 359/76 |
| 5,398,127 | 3/1995 | Kubota et al. | 359/75 |
| 5,416,619 | 5/1995 | Koike | 359/57 |
| 5,453,862 | 9/1995 | Toko et al. | 359/76 |
| 5,473,455 | 12/1995 | Koike et al. | 359/76 |
| 5,495,355 | 2/1996 | Konuma | 359/78 |

FOREIGN PATENT DOCUMENTS

| | | |
|---|---|---|
| 60-211424 | 10/1985 | Japan . |
| 60-211425 | 10/1985 | Japan . |
| 2-12 | 11/1987 | Japan . |
| 1-210932 | 8/1989 | Japan . |
| 2-55330 | 2/1990 | Japan . |
| 3-230120 | 10/1991 | Japan . |
| 4-12314 | 1/1992 | Japan . |
| 5-5886 | 1/1993 | Japan . |
| 5-107544 | 4/1993 | Japan . |
| 5-173135 | 7/1993 | Japan . |
| 5-173136 | 7/1993 | Japan . |
| 5-173137 | 7/1993 | Japan . |
| 5-173138 | 7/1993 | Japan . |
| 5-188374 | 7/1993 | Japan . |
| 5-224210 | 9/1993 | Japan . |
| 5-303099 | 11/1993 | Japan . |

OTHER PUBLICATIONS

Patent Abstracts of Japan, vol. 013, No. 583 (P–981) 22 Dec. 1989, & JP-A-01245223 (Nippon Telegr & Teleph Corp) 29 Sep. 1989.

Patent Abstracts of Japan, vol. 013, No. 505 (P–959), 14 Nov. 1989 & JP-A-01 204 025 (Konica Corp) 16 Aug. 1989.

Patent Abstracts of Japan, vol. 013, No. 440 (P–940) 4 Oct. 1989 & JP-A-01 169 428 (Alps Electric Co Ltd) 4 Jul. 1989.

Patent Abstracts of Japan, vol. 013, No. 306 (P–897) 13 Jul. 1989 & JP-A-01 079 725 (Matsushita Electric Ind Co Ltd) 24 Mar. 1989.

Patent Abstracts of Japan, vol. 014, No. 230 (P–1048) 16 May 1990 & JP-A-02 055 330 (Matsushita Electric Ind Co Ltd) 23 Feb. 1990.

Patent Abstracts of Japan, vol. 017, No. 631 (P–1648) 22 Nov. 1993 & JP-A-05 203 951 (NEC Corp) 13 Aug. 1993.

Patent Abstracts of Japan, vol. 017, No. 611 (P–1641) 10 Nov. 1993 & JP-A-05 188 374 (Matsushita Electric Ind Co Ltd) 30 Jul. 1993.

Patent Abstracts of Japan, vol. 017, No. 265 (P–1542) 24 May 1993 & JP-A-05 005 886 (Matsushita Electric Ind Co Ltd) 14 Jan. 1993.

Patent Abstracts of Japan, vol. 011, No. 097 (P–560) 26 Mar. 1987 & JP-A-61249021 (Citizen Watch Co Ltd) 6 Nov. 1986.

Patent Abstracts of Japan, vol. 013, No. 361 (P–917) 11 Aug. 1989 & JP-A-01 120 531 (Alps Electric Co Ltd) 12 May 1989.

Patent Abstracts of Japan, vol. 013, No. 361 (P–917) 11 Aug. 1989 & JP-A-01 120 533 (Alps Electric Co Ltd) 12 May 1989.

Koike et al., "A Full–Color TFT–LCD With a Domain–Divided Twisted–Nematic Structure", SID1992 International Symposium—Digest of Technical Papers, May 1992, Playa De Rey, CA, pp. 798–801.

Takatori et al., "Complementary TN LCD with Wide–Viewing Angle Grayscale", Japan Display '92, pp. 591–594.

Kamada et al, "PD–12 Wide Viewing Angle Full–Color TFT LCDs", Japan Display '92, p. 886.

Patent Abstract of Japan, vol. 011, No. 373 (P–643) 5 Dec. 1987 & JP-A-62 144 133 (Seiko Epson Corp) 27 Jun. 1987.

Patent Abstracts of Japan, vol. 009, No. 304 (P–409) 30 Nov. 1985 & JP-A-60 136 716 (Nihon Seiki KK) 20 Jul. 1985.

Patent Abstracts of Japan, vol. 010, No. 080 (P–441) 29 Mar. 1986 & JP-A-60 217 341 (Citizen Tokei KK) 30 Oct. 1985.

IBM Technical Disclosure Bulletin, vol. 33, No. 18, Jun. 1990, New York, US, pp. 199–200, XP000122861, "Controlled Two– and Four–Domain Twisted Nematic Liquid Crystal Displays".

$\Delta n > 0$ $\Delta n = 0$ $\Delta n > 0$

LIQUID CRYSTAL DISPLAY APPARATUS HAVING PLURAL REGIONS OF DIFFERENT ALIGNING CONDITIONS AND METHOD FOR PRODUCING THE SAME

BACKGROUND OF THE INVENTION

1. Field of the Invention

The present invention relates to a liquid crystal display apparatus with a wide viewing angle and a method for producing the same.

2. Description of the Related Art

In a liquid crystal display (LCD), a liquid crystal layer including liquid crystal molecules is provided between a pair of substrates. When the alignment of the liquid crystal molecules is changed, the optical refractive index of the liquid crystal layer is also changed. By utilizing the change in the refractive index, the LCD performs the display. Accordingly, it is important that the liquid crystal molecules are arranged as regularly as possible in the initial state. In order to arrange for the regularity of the liquid crystal molecules in the initial state, the surface conditions of the substrates which sandwich the liquid crystal layer should regulate the interactions between the liquid crystal molecules and the surfaces.

In the method for performing such a regulation which is currently the most widely used, materials for liquid crystal alignment films are applied to each of the surfaces of the substrates which face the liquid crystal layer. The applied materials are dried and cured, so as to form the alignment film. Thereafter, the surface of the alignment film is rubbed. When a liquid crystal layer is provided between the substrates having such rubbed alignment films, liquid crystal molecules which are in contact with the alignment films are aligned along the rubbing direction.

There are two types of alignment films for regulating the alignment of the liquid crystal, i.e., an inorganic alignment film and an organic alignment film. Materials for the inorganic alignment film include oxides, inorganic silane, metals, and metal complexes, whereas materials for the organic alignment film include polyimides. A typical material for the liquid crystal alignment film which is currently employed is polyimide resin. The polyimide resin produced in the following manner. A polyamic acid, which is a precursor for all aromatic polyimides (all aromatic PI), is first applied to a substrate. Then, the substrate with the polyamic acid is heated so that an imidization reaction occurs. As a result, the polyamic acid is converted into a polyimide resin. The reasons why the polyimide resin is widely used for the liquid crystal alignment film material are the concentration and the viscosity thereof can easily be adjusted since the polyamic acid has a good solubility, the polyimide resin has a good applicability, and the thickness of the polyimide resin film can be easily controlled. The produced polyimide resin is more stable in terms of energy than polyamic acid. Accordingly, when the substrate with the polyimide resin is cleaned by water, a reversible reaction will not occur.

The polyimide film which is formed on the substrate in the above-described manner is unidirectionally rubbed with a burnishing cloth or the like. Thus, the liquid crystal molecules can be aligned in the rubbing direction. The rubbing treatment is unidirectionally performed on the substrate, so that the tilt angles (i.e., pretilt angles) of the liquid crystal molecules in the liquid crystal layer which are contact with the alignment film are all equal to each other. Accordingly, in each picture element constituting a dot as a unit of a matrix-type display pattern, all the pretilt angles are substantially equal to each other and are aligned in one direction.

In an active matrix type LCD which uses thin film transistors as switching elements connected to respective pixel electrodes constituting picture elements of the display pattern, that is, in a TFT-LCD, a construction of a twisted nematic (TN) type liquid crystal layer is adopted (an LCD of the TN mode). In such an LCD of the TN mode, the liquid crystal molecules between the pair of substrates are continuously twisted by 90° along the direction perpendicular to the surfaces of the substrates.

FIG. 20 is a plan view of an exemplary TN type LCD, and FIG. 21A shows a cross section of a picture element portion of the TN type LCD. The LCD is a TFT-LCD of an active matrix type. As is shown in FIG. 21A, a liquid crystal layer 133 is sandwiched between substrates 131 and 132 which are provided so as to face each other. The substrates 131 includes a glass substrate 131a on which scanning lines 112 and signal lines 113 are formed so as to cross each other. In the vicinity of the crossings of the scanning lines 112 and the signal lines 113, thin film transistors (TFTs) 120 as nonlinear switching elements are formed. In areas enclosed by the scanning lines 112 and the signal lines 113, pixel electrodes 110 are formed, respectively, in such a manner that part of each pixel electrode 110 and the scanning line 112 are overlapped. The overlapping area 118 in which the pixel electrode 110 and the scanning line 112 are overlapped functions as an additional capacitance. Each of the TFTs 120 includes a gate electrode 115 which is branched from a scanning line 112, a source electrode 116 which is branched from a signal line 113, and a drain electrode 117 for connecting the TFT 120 to a pixel electrode 110. Over the glass substrate 131a on which the above-mentioned elements are formed, an insulating protective film 131d and an alignment film 131e are formed in that order.

The other substrate 132 also has a glass substrate 132a on which a color filter 132b and a transparent electrode 132c are formed in this order. Over the glass substrate 132a on which the above-mentioned elements are formed, an insulating protective film (not shown) and an alignment film 132e are formed in that order. The alignment film can also function as an insulating protective film.

In the liquid crystal layer 133 sandwiched between the above-described substrates 131 and 132, the liquid crystal molecules are aligned such that the orientation directions are continuously twisted by 90° along the direction perpendicular to the surfaces of the substrates. A liquid crystal molecule 133a near the middle position along the direction perpendicular to the surfaces of the substrates has a predetermined angle with respect to the substrate surface. The substrates 131 and 132 are sealed at their ends by a resin or the like (not shown), and a peripheral circuit or the like for driving the liquid crystal is externally mounted. LCDs which are of types other than the active matrix type also have the same construction as that described above.

In the TN type LCD, by the application of a voltage across the substrates 131 and 132, an electric field is generated in a direction perpendicular to the surfaces of the substrates 131 and 132. In accordance with the dielectric anisotropy of liquid crystal, the liquid crystal molecules stand. By aligning the liquid crystal molecules in parallel to the direction of the electric field, the birefringence of the liquid crystal layer 133 is varied. If the direction of the electric field is perpendicular to the direction to which the liquid crystal molecules stand during no voltage application, that is, if the pretilt angle is 0, the direction to which the liquid crystal molecules stand is not uniquely determined. As a result, a disclination line is generated between liquid crystal domains having different standing directions in response to the electric field. Such a disclination line degrades the display quality. Thus, in order to prevent the generation of the disclination line, as shown in FIG. 21A, the liquid crystal molecules are previously set to be tilted (i.e., to have a pretilt angle).

FIG. 21B shows the initial orientation of liquid crystal when the liquid crystal panel shown in FIG. 21A is viewed from the side of the substrate 132 which is the upper one in FIG. 21A. Vector a in FIG. 21B indicates the rubbing direction of the alignment film 132e, vector b indicates the rubbing direction of the alignment film 131e. The liquid crystal molecules in the vicinity of each of the alignment films 131e and 132e are aligned along the respective rubbing direction (a or b in FIG. 21B) with a pretilt angle δ. The rubbing directions a and b forms an angle of 90° therebetween (the twist angle θt=90° in FIG. 21B). The liquid crystal molecules in the liquid crystal layer 133 are continuously twisted by 90° along the thickness direction of the liquid crystal layer 133. Accordingly, the liquid crystal molecule 133a near the middle position in the thickness direction of the liquid crystal layer 133 is also tilted by the angle δ with respect to the substrates 131 and 132. The orientation direction of the liquid crystal molecule 133a near the middle position is indicated by vector c in FIG. 21B. The vector c divides the twist angle θt into two equal angles.

Herein, the plus side of the viewing angle θv in FIG. 21A (the side indicated by θ1) is referred to as a positive viewing direction, and the minus side of the viewing angle θv in FIG. 21A (the side indicated by θ2) is referred to as a negative viewing direction. Specifically, the direction in which the liquid crystal panel is viewed from a viewing point on the right side of a broken line in FIG. 21B (i.e., a line which is perpendicular to the orientation direction C of the liquid crystal molecule near the center position of the liquid crystal layer, and which divides the liquid crystal panel into two equal parts) is referred to as a positive viewing direction. The in-plane orientation direction of the liquid crystal panel of the liquid crystal molecule 133a positioned near the center of the liquid crystal layer (c in FIG. 21B) is referred to as a reference orientation direction. As is seen from FIG. 21B, the reference orientation direction divides the twist angle θt of the liquid crystal layer 133 into two equal angles. Also, the minus direction of c is referred to as a reference viewing direction v. That is, the reference viewing direction v is the representative positive viewing direction.

Also herein, an imaginary clockface (dial) is drawn on the liquid crystal panel, and the orientation direction of liquid crystal in the liquid crystal layer is indicated by the clock representation method. Specifically, in the construction in which the display on the liquid crystal panel is actually viewed by a viewer, the upper side of the liquid crystal panel is represented as 12 o'clock, the lower side thereof is represented as 6 o'clock. In a similar way, the orientation direction of the liquid crystal layer is represented as the time in the clock indicated by the reference orientation direction of the liquid crystal layer in the liquid crystal panel. For example, the liquid crystal layer having the reference orientation direction c as shown in FIG. 21B is represented in such a manner as to "be oriented at 3 o'clock" in the construction in which the front side of the figure sheet is regarded as the upper side of the liquid crystal panel.

In the TN mode LCD, since the liquid crystal molecules are aligned in the above-described manner, there occurs a phenomenon in which the contrast is different depending on the angle at which the LCD is viewed. The reasons why the contrast changes will be described below.

FIG. 22 shows an exemplary applied voltage to transmittance characteristics in a normally white mode of an LCD in which light is transmitted during the no voltage application so as to perform a white display.

In FIG. 22, solid line L1 shows the applied voltage to transmittance characteristic when the LCD shown in FIG. 21A is viewed in the direction perpendicular to the surfaces of the substrates (θv=0°). In this case, as the applied voltage value becomes high, the transmittance of light is decreased. When the voltage value reaches a specific value, the transmittance becomes substantially equal to zero. Accordingly, even when a much higher voltage is applied, the transmittance remains at substantially zero.

When the viewing angle is inclined from the direction perpendicular to the substrate face to the positive viewing direction, the applied voltage to transmittance characteristic is varied as is shown by solid line L2 in FIG. 22. Specifically, as the applied voltage becomes high, the transmittance is decreased to some extent. When the applied voltage exceeds a specific value, the transmittance is increased. Then, the transmittance is gradually decreased. Therefore, when the viewing angle is inclined in the positive viewing direction, there occurs a phenomenon in that the black and the white (the negative and positive) of the image are inverted at a specific angle. This phenomenon occurs because the apparent birefringence of liquid crystal molecules having optical anisotropy is varied depending on the viewing angle.

Referring to FIGS. 23A to 23C, the phenomenon will be described in detail. As is shown in FIG. 23A, when the applied voltage is zero or a relatively lower voltage, the center molecule 133a of the liquid crystal layer is observed in the form of an ellipse by the viewer 137 positioned in the positive viewing direction. As the applied voltage is gradually increased, the center molecule 133a is moved in such a manner that the longer axis becomes aligned along the direction of the electric field, i.e., the direction perpendicular to the substrate face. Accordingly, the center molecule 133a is momentarily observed in the form of a circle by the viewer 137, as is shown in FIG. 23B. As the voltage is further increased, the center molecule 133a becomes substantially in parallel to the electric field direction. As a result, the center molecule 133a is observed again in the form of an ellipse by the viewer 137, as is shown in FIG. 23C. In this way, the inversion phenomenon occurs.

If the viewing angle is tilted in the negative viewing direction, the variation of the light transmittance with respect to the applied voltage is relatively small as compared with the case of being viewed from the direction perpendicular to the substrates, as is shown by solid line L3 in FIG. 22. As a result, when the LCD is viewed from the negative viewing direction, the inversion phenomenon does not occur, but the contrast is greatly degraded.

In the TN mode LCD, the inversion phenomenon when viewed from the positive viewing direction and the degradation of contrast when viewed from the negative viewing direction cause serious problems for the viewer, and they result in doubts about the display properties of the LCD.

A technique for suppressing the inversion phenomenon in the TN mode LCD is described in, for example, Japanese Laid-Open Patent Publication No. 2-12. According to the technique, in the active matrix type LCD, a display electrode constituting a picture element is divided into an inner electrode and an outer electrode. By changing the conditions of the electric field applied to the liquid crystal molecules on the inner electrode side from those of the electric field applied to the liquid crystal molecules on the outer electrode side in an attempt to improve the viewing characteristics.

However, the technique disadvantageously necessitates a variety of the electrode patterns, so that the production process and the driving method become complicated. Moreover, the resulting improvement of the viewing angle characteristics is not considered as being so remarkable.

JAPAN DISPLAY '92, pages 591–594, and page 886 describe the following two methods for eliminating the above-described inversion phenomenon. In one method, the surface of the alignment film is unidirectionally rubbed, and then a resist is deposited on a part of the alignment film. Then, the rubbing is performed in the direction reversed to the previous rubbing direction. Thereafter, the resist is removed. As a result, the alignment film is provided with different aligning conditions caused by the different rubbing directions between the alignment film surface covered with the resist and the alignment film surface not covered with the resist, so as to differentiate the pretilt angles. In the other method, alignment films made of different materials are selectively formed and then they are subjected to the rubbing treatment. As a result, a plurality of pretilt angles are formed on the alignment films depending on the materials thereof. By the use of the fact that the reference orientation direction is controlled by the larger one of different pretilt angles, the reference orientation directions which are different from each other by 180° are provided in one and the same liquid crystal layer.

According to these methods, liquid crystal regions having the reference orientation directions different from each other by 180° are mixedly formed in one and the same liquid crystal layer, so that the viewer can mixedly observe the viewing characteristics in both directions. As a result, the inversion phenomenon in the positive viewing direction and also the significant reduction of the contrast in the negative viewing direction are reduced and improved. However, these methods include a photolithography process, and hence involve a contamination problem of the alignment films. In the former proposed method, if the resist is deposited on the surface of the alignment film, the alignment regulating property of the alignment film surface is greatly deteriorated. In the latter proposed method, the patterning of the alignment films requires complicated processing steps. For these reasons, the above methods are not practical.

In another attempt to eliminate the inversion phenomenon in the positive viewing direction and the contrast degradation in the negative viewing direction, a rectangular region 119 in which the reference orientation direction is different from that in the other region is formed in part of a picture element shown by a dotted line in FIG. 19. In more detail, the liquid crystal regions having the reference orientation directions which are different from each other by 180° are formed in one picture element, so that the contrast degradation in the negative viewing direction is compensated, and the inversion phenomenon in the positive viewing direction is suppressed.

However, in the above method in which liquid crystal regions having the reference orientation directions which are different from each other in one picture element, as the time elapses, the aligning condition of one region may be absorbed by the aligning condition of the other region. In addition, in the boundary area between the liquid crystal regions (an area indicated by dimension line in FIG. 21A), a disclination line occurs, i.e., the liquid crystals cannot be driven by the influence of both aligning conditions. This causes the contrast to be degraded.

SUMMARY OF THE INVENTION

The liquid crystal display apparatus of this invention includes a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer. In the liquid crystal display apparatus, the liquid crystal layer includes two or more liquid crystal layer regions of different aligning conditions, and at least one of the alignment films has surface tensions which are different from each other in surface regions thereof corresponding to the respective liquid crystal layer regions of different aligning conditions.

In one embodiment of the invention, each of the surface regions having different surface tensions of the at least one of the alignment films is formed in a corresponding one of picture elements which are disposed in a matrix.

In another embodiment of the invention, in the surface regions having a larger surface tension, a pretilt angle of liquid crystal is set to be small, and in the surface regions having a smaller surface tension, a pretilt angle of liquid crystal is set to be large.

In another embodiment of the invention, the surface regions having a larger surface tension and the surface regions having a smaller surface tension are arranged alternately on both of the alignment films, and the surface regions having a larger surface tension on one of the alignment films face the surface regions having a smaller tension on the other of the alignment films.

According to another aspect of the invention, a liquid crystal display apparatus includes a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer. In the liquid crystal display apparatus, the liquid crystal layer includes two or more liquid crystal layer regions of different aligning conditions, and at least one of the alignment films has oxygen atom concentrations which are different from each other in surface regions thereof corresponding to the respective liquid crystal layer regions of different aligning conditions.

In one embodiment of the invention, each of the surface regions having different oxygen atom concentrations of the at least one of the alignment films is formed in a corresponding one of picture elements which are disposed in a matrix.

In another embodiment of the invention, in the surface regions having a higher oxygen atom concentration, a pretilt angle of liquid crystal is set to be small, and in the surface regions having a lower oxygen atom concentration, a pretilt angle of liquid crystal is set to be large.

In another embodiment of the invention, the surface regions having a higher oxygen atom concentration and the surface regions having a lower oxygen atom concentration are arranged alternately on both of the alignment films, and the surface regions having a larger surface tension on one of the alignment films face the surface regions having a smaller tension on the other of the alignment films.

In another embodiment of the invention, the liquid crystal display apparatus further includes nonlinear elements connected to the respective picture elements, and a light blocking film which is made of the same material as that of an opaque layer constituting the nonlinear elements.

According to another aspect of the invention, a liquid crystal display apparatus includes a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer. In the liquid crystal display apparatus, the liquid crystal layer includes two or more liquid crystal layer regions of different aligning conditions, and at least one of the alignment films has carbonyl radical concentrations which are different from each other in surface regions thereof corresponding to the respective liquid crystal layer regions of different aligning conditions.

In one embodiment of the invention, each of the surface regions having different carbonyl radical concentrations of the at least one of the alignment films may be formed in a corresponding one of picture elements which are disposed in a matrix.

In another embodiment of the invention, in the surface regions having a higher carbonyl radical concentration, a pretilt angle of liquid crystal is set to be small, and in the surface regions having a lower carbonyl radical concentration, a pretilt angle of liquid crystal is set to be large.

In another embodiment of the invention, the surface regions having a higher carbonyl radical concentration and the surface regions having a lower carbonyl radical concentration are arranged alternately on both of the alignment films, and the surface regions having a larger surface tension on one of the alignment films face the surface regions having a smaller tension on the other of the alignment films.

In the above-mentioned liquid crystal display apparatus of the invention, each of the alignment films may be made of an organic polymer material containing at least one of polyimide, polyamide, polystyrene, polyamideimide, epoxyacrylate, spiranacrylate, and polyurethane as a main component.

According to another aspect of the invention, a method for producing a liquid crystal display apparatus is provided. The liquid crystal display apparatus includes a pair of substrates and a liquid crystal layer sandwiched between the pair of substrates with alignment films of an organic polymer formed at interfaces between the liquid crystal layer and the respective substrates, the alignment films regulating aligning conditions of liquid crystal in the liquid crystal layer, the liquid crystal layer including two or more liquid crystal layer regions of different aligning directions. The method includes a step of selectively irradiating at least one of the alignment films with light, so as to have surface tensions, oxygen atom concentrations, or carbonyl radical concentrations which are different from each other in surface regions of the at least one of the alignment films corresponding to the respective liquid crystal layer regions of different aligning conditions.

In one embodiment of the invention, the light has a wavelength in a ultraviolet range.

In another embodiment of the invention, the surface regions include first regions which are irradiated with light and second regions which are not irradiated with light, the first surface regions and the second surface regions are arranged alternately on both of the alignment films, and the first surface regions on one of the alignment films face the second surface regions on the other of the alignment films.

In the above-mentioned liquid crystal display apparatus of the invention, the two or more liquid crystal layer regions having different aligning conditions may be formed in each of picture elements in a band-like shape, and a boundary between one liquid crystal layer region and a liquid crystal layer region adjacent thereto is continuously extended over two or more picture elements.

In the above-mentioned liquid crystal display apparatus of the invention, the two or more liquid crystal layer regions having different aligning conditions may be formed in each of picture elements in a band-like shape, and a boundary between one liquid crystal layer region and a liquid crystal layer region adjacent thereto is parallel to an aligning direction of liquid crystal molecules which are in contact with one of the pair of substrates.

In one embodiment of the invention, the liquid crystal display apparatus further includes signal lines disposed in the vicinity of the respective picture elements and nonlinear elements for connecting the picture elements to the signal lines, wherein positions of the nonlinear elements or the aligning conditions in the liquid crystal layer regions having different aligning conditions are determined so that the boundary is located most remotely from the nonlinear element.

In another embodiment of the invention, in the above-mentioned liquid crystal display apparatus, the two or more liquid crystal layer regions having different aligning conditions are formed in each of picture elements, and a boundary between adjacent liquid crystal layer regions is covered with a light blocking film.

In another embodiment of the invention, in the above-mentioned liquid crystal display apparatus, a boundary between one liquid crystal layer region and a liquid crystal layer region adjacent thereto is covered with a light blocking film.

According to another aspect of the invention, a method for producing a liquid crystal display apparatus including a pair of substrates and a liquid crystal layer sandwiched between the pair of substrates is provided. The method includes the steps of: forming alignment films for regulating aligning conditions of liquid crystal in the liquid crystal layer on the pair of substrates, respectively; and selectively irradiating at least one of the alignment films with light while a gas including at least one of oxygen and ozone is in contact with the at least one of the alignment films.

In one embodiment of the invention, the gas includes oxygen having a concentration of 25 vol % or more.

In another embodiment of the invention, the gas includes ozone having a concentration of $1 \times 10^{-4}$ vol % or more.

In another embodiment of the invention, the step of selectively irradiating at least one of the alignment films with light includes a step of forming first regions which are irradiated with light and second regions which are not irradiated with light, and a step of forming the first regions and the second regions on the other of the alignment films, the first regions and the second regions being arranged alternately on both of the alignment films, the first regions of the one of the alignment films facing the second regions of the other of the alignment films.

According to still another aspect of the invention, a method for producing a liquid crystal display apparatus including a pair of substrates and a liquid crystal layer sandwiched between the pair of substrates is provided. The method includes the steps of: forming alignment films for regulating aligning conditions of liquid crystal in the liquid crystal layer on the pair of substrates, respectively; and selectively irradiating at least one of the alignment films with light in an atmosphere including an inert gas.

In one embodiment of the invention, the atmosphere includes the inert gas at the volume ratio of 85% to 100%.

In another embodiment of the invention, the light is ultraviolet rays or ultraviolet laser light.

In another embodiment of the invention, the inert gas is selected from a group of nitrogen, helium, neon, and argon.

In another embodiment of the invention, the step of selectively irradiating at least one of the alignment films with light includes a step of forming first regions which are irradiated with light and second regions which are not irradiated with light on one of the alignment films, and a step of forming the first regions and the second regions on the other of the alignment films, the first regions and the second regions being arranged alternately on both of the alignment films, the first regions of the one of the alignment films facing the second regions of the other of the alignment films.

According to still another aspect of the invention, a method for producing a liquid crystal display apparatus including a pair of substrates and a liquid crystal layer sandwiched between the pair of substrates is provided. The method includes the steps of: forming alignment films for regulating aligning conditions of liquid crystal in the liquid crystal layer on the pair of substrates, respectively; and selectively irradiating at least one of the alignment films with light in an atmosphere at a reduced pressure or under vacuum.

In one embodiment of the invention, the reduced pressure of the atmosphere is in the range of 0.5 atm to 0 atm.

In another embodiment of the invention, the light is ultraviolet rays, visible rays, infrared rays, or laser light having the same wavelength range as the rays.

In another embodiment of the invention, the step of selectively irradiating at least one of the alignment films with light includes a step of forming first regions which are irradiated with light and second regions which are not irradiated with light on one of the alignment films, and a step of forming the first regions and the second regions on the other of the alignment films, the first regions and the second regions being arranged alternately on both of the alignment films, the first regions of the one of the alignment films facing the second regions of the other of the alignment films.

According to the LCD of the invention, a plurality of liquid crystal layer regions having different pretilt angles from each other can be formed in a liquid crystal panel. In addition, in one picture element, a plurality of liquid crystal layer regions having different pretilt angles from each other can be formed. Accordingly, in a plurality of picture elements, or in one picture element, reference orientation directions which are opposite to each other can be obtained, and therefore reference viewing directions which are different from each other by 180° are mixed. As a result, an LCD having a wide viewing angle with improved display quality can be provided.

According to the invention, the boundary between liquid crystal layer regions having a plurality of different reference orientation directions are continuously formed over at least two or more picture elements, so that the free energy of the boundary is reduced and one aligning condition is prevented from being absorbed into another aligning condition.

The boundary between liquid crystal layer regions having different reference orientation directions in one picture element is parallel to the aligning direction of liquid crystal molecules which are in contact with one of substrates, so that the disorder of the alignment of liquid crystal molecules is suppressed. As a result, the generation of the disclination line can be suppressed.

In addition, if the boundary is covered with a light blocking film, the covered portion does not contribute to the display, irrespective of the generation of disclination line.

If the light blocking film is made of a material which is used for a non-linear element, another additional process is not required.

In a method according to the invention, the alignment film which controls the alignment of the liquid crystal layer is brought in contact with a gas including at least one of oxygen and ozone, and is irradiated with light. If the alignment film is irradiated with light without using such a gas, $O_3$ (ozone) is generated. The $O_3$ oxidizes alkyl radicals of polyimide, so as to produce carbonyl radicals. Due to the carbonyl radicals, the polarity of the surface of the alignment film is changed. If the above-described gas, preferably ozone, exists in the vicinity of the alignment film at this time, the polarity of the surface of the alignment film is more rapidly changed. As a result, the surface of the alignment film is changed at a higher speed than in the case where oxygen and ozone do not exist in the vicinity of the film to be the alignment film.

According to the invention, by controlling the amount of oxygen which influences the alignment film surface in the light blocking portion, it is possible to stably control the pretilt angle. Such a control is performed for the following reasons.

The change of pretilt angle by light irradiation occurs as the result of the following two types of reactions. The first reaction is the dissociation or generation of polymer bonding in the alignment film by the application of high energy. The other reaction is the absorption of short-wavelength ultraviolet rays by oxygen in the air so as to generate ozone and activating oxygen, which accordingly improves the quality of the alignment film surface.

In the case where the irradiation of short-wavelength ultraviolet rays is performed in the air, the latter reaction dominantly occurs, so that the quality of the alignment film surface is rapidly improved by the ozone and activating oxygen. However, in this reaction, the activated oxygen freely travels in the space, so that the reaction progresses to a portion which is essentially intended to be protected by blocking light. If the reaction reaches the light blocking portion, the pretilt angle of liquid crystal molecules which are in contact with the portion changes. Thus, it becomes difficult to control the reference orientation direction by means of the pretilt angle. Even in an irradiated portion, if the irradiation amount becomes too large, the improvement of the surface quality progresses and the thickness of the film is decreased. If the irradiation amount is further increased, the film itself becomes lost. In order to secure a difference in the pretilt angle between the liquid crystal molecules in contact with the irradiated portion and the liquid crystal molecules in contact with the light blocking portion, it is necessary to strictly control the light irradiation conditions such as the light intensity, and the irradiation amount.

The following two methods can be applied for controlling the amount of oxygen. One method is to irradiate the alignment film with light in an atmosphere which is partially replaced with an inert gas. The irradiation may be performed in an atmosphere of 100% of inert gas. In the usual air, the ratio of the inert gas to the air is 80%. By the irradiation in an atmosphere including 85% of inert gas, the reaction rate is not so reduced, but the light blocking portion is somewhat affected. By the irradiation in an atmosphere including 100% of inert gas, the light blocking portion is not at all affected, but the reaction rate is reduced. On the basis of the desired pretilt angle and the like, the optimal mixing ratio is determined.

The other method is to irradiate the alignment film with light at a reduced pressure. This method may be performed under a perfect vacuum. By this method, as the reduction degree of pressure is increased, the reaction rate is lowered.

By controlling the amount of oxygen by using these methods, the pretilt angle control in which the mechanism for dissociation and generation of polymer bonding by light is dominant can be realized. Thus, the change of pretilt angle in the light blocking portion is suppressed, irrespective of the light irradiation conditions. Accordingly, it becomes possible to stably control the tilting angle, so that an LCD with a wide viewing angle can be stably produced with a good yield.

If the light irradiation is performed under a low pressure or under a vacuum, visible rays or infrared rays can be used instead of the ultraviolet rays. In the case where the control of the pretilt angle by light irradiation is performed with the visible rays or infrared rays, ozone and activating oxygen is not generated. However, when the irradiation is performed in the air, the light attenuates due to the absorption and scattering in an air layer. According to the invention, the light irradiation is performed under a low pressure or under a vacuum, so that the amount of light which reaches the alignment film surface is increased in the case of the use of visible rays or infrared rays. Thus, the irradiation efficiency is increased.

Thus, the invention described herein makes possible the advantages of (1) providing an LCD with a wide viewing angle in which the viewing characteristics can be effectively improved and the display quality is improved and a method for producing the same, (2) providing a method for producing the LCD with good producibility, and (3) providing a method for precisely producing the LCD.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1A:
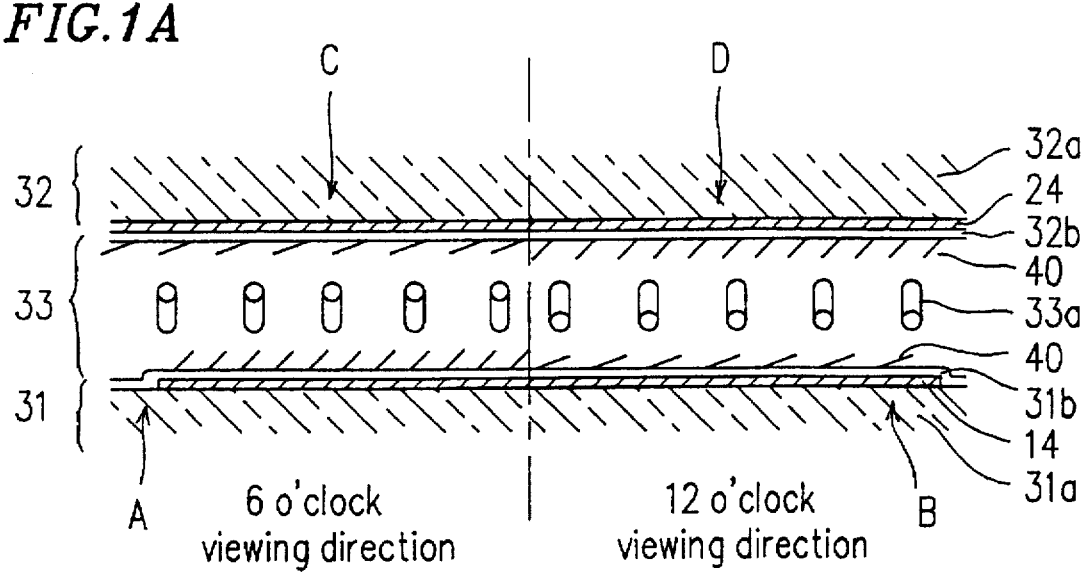
FIG. 1A, is a cross-sectional view schematically showing a liquid crystal apparatus according to Example 1 of the invention.

FIG. 1A is a cross-sectional view showing an LCD according to the invention. The LCD is of an active matrix type. In the LCD, as is shown in FIG. 1A, a pair of substrates 31 and 32 are provided so as to sandwich a liquid crystal layer 33. In the counter substrate 32 which is the upper one of the paired substrates, a counter electrode 24 and an alignment film 32b are formed in-this order on an insulating substrate 32a made of glass, silicon wafer, or the like. The alignment film 32b is disposed on the side which is adjacent to the liquid crystal layer 33.

In the base substrate 31 which is the lower one of the paired substrates, pixel electrodes 14 and an alignment film 31b are formed in this order on an insulating substrate 31a made of glass, silicon wafer, or the like. In FIG. 1A, only one pixel electrode 14 is shown. In the actual substrate, a plurality of pixel electrodes 14 are provided in a matrix. Also, a plurality of scanning lines (not shown) are juxtaposed in such a manner that they are extended on both sides of respective pixel electrodes 14 along the peripheries thereof. A plurality of signal lines (not shown) are juxtaposed so as to cross the scanning lines in such a manner that they are extended on both sides of respective pixel electrodes 14 along the peripheries thereof. In addition, in the vicinity of each of crossings of the signal lines and the scanning lines, a thin film transistor (TFT, not shown) functioning as a switching element is provided. The TFT is electrically connected to a signal line and a scanning line. Furthermore, over the insulating substrate 31a having the above-described structure, an alignment film 31b is formed. The alignment film 31b is disposed on the side which is adjacent to the liquid crystal layer 33.

In the alignment films 31b and 32b respectively provided on the sides of the substrates 31 and 32, two portions having different pretilt angles 40 are defined above each of the pixel electrodes 14 as shown in FIG. 1A. Specifically, the alignment film 31b formed on the substrate 31 has a portion A having a larger pretilt angle 40 and a portion B having a smaller pretilt angle 40 on one pixel electrode 14. The alignment film 32b formed on the substrate 32 has a portion C having a smaller pretilt angle C and a portion D having a larger pretilt angle C above one pixel electrode 14. Furthermore, the pretilt angles are set in the following manner. The pretilt angle of portion A is larger than that of portion C. The pretilt angle of portion B is smaller than that of portion D.

The substrates 31 and 32 thus obtained are sealed at their ends by a resin or the like, and a peripheral circuit or the like is externally mounted.

In the LCD in this example having the above construction, the alignment films 31b and 32b are formed in the following manner.

First, films to be the alignment films 31b and 32b are formed on the substrates 31 and 32, respectively. The films are unidirectionally rubbed. Then, the above-described portions A, B, C and D are defined in the alignment films 31b and 32b. In this example, after the formation of the alignment films of polyimide, the alignment film 31b except for the portion B was covered with a mask, and then the alignment film 31b was irradiated with ultraviolet rays from the side on which the mask was provided. Then, the alignment film 32b except for the portion C was covered with a mask, and then the alignment film 32b was irradiated with ultraviolet rays from the side on which the mask was provided. The irradiation of the alignment film 32b may be performed prior to the irradiation of the alignment film 31b.

As described above, by irradiating the alignment film surface with ultraviolet rays, the surface tension of the irradiated portion of the alignment film is increased. The increase of surface tension causes the pretilt angle of liquid crystal molecules which are in contact with the alignment film to be decreased.

After the portions A, B, C and D were defined, the substrates 31 and 32 are arranged so that the pretilt angles 40 are set so as to be different between the substrates 31 and 32 which face each other. In other words, the substrates 31 and 32 are arranged so that the portions having different surface tensions face each other.

Then, the gap between the substrates 31 and 32 is filled with the liquid crystal. The liquid crystal employed in this example is selected in the following manner. If the substrates 31 and 32 are arranged so that the liquid crystal molecules will make a right-handed twist going from one substrate to the other, left-handed twisted liquid crystal is selected. If the substrates 31 and 32 are arranged to correspond to the left-handed twisted liquid crystal, right-handed liquid crystal is selected.

As a result, as shown in FIG. 1A, two liquid crystal layer regions are formed in one picture element corresponding to one pixel electrode 14: One is a region where the pretilt angles of the substrate 31 are larger than that of the substrate 32, and the other is a region where the pretilt angles of the substrate 32 are larger than that of the substrate 31. In both liquid crystal layer regions, the in-plane directions of the liquid crystal molecules at the middle position along the thickness direction of the liquid crystal layer 33 (i.e., the reference orientation directions) are controlled by the alignment film having a larger pretilt angle. Therefore, the reference orientation directions in the two liquid crystal layer regions are different from each other by 180°.

Figure 1B:
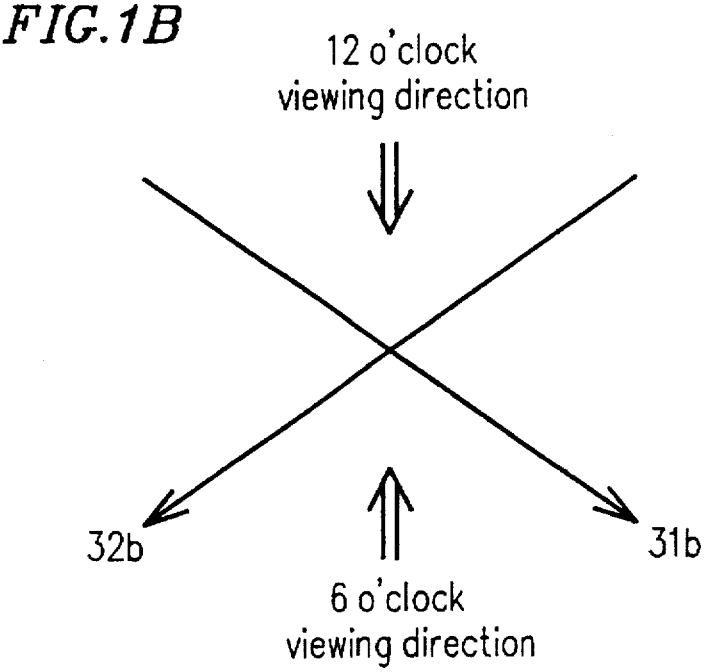
FIG. 1B shows an exemplary relationship between rubbing directions and the reference orientation directions in the LCD shown in FIG. 1A.

In this example, the arrangement of the substrates 31 and 32 and the twisted angle and direction of the liquid crystal layer are determined so that the reference viewing directions which are different from each other by 180° should coincide with the 6 o'clock viewing direction and the 12 o'clock viewing direction. FIG. 1B shows an exemplary arrangement of the directions in which the alignment films 31b and 32b are rubbed in this example.

Accordingly, in the LCD of this example, when a voltage is applied to the pixel electrode 14, the left and right halves of the liquid crystal layer region perform a display with opposite viewing directions. Therefore, unlike the prior art, it is unnecessary to drive the right and left halves with different voltages. In addition, since the viewing directions are opposite each other, the viewing performance can be sufficiently improved.

The phenomenon in which the surface tension in the irradiated portion of the alignment film is increased can be confirmed, for example, by the usual contact-angle measurement using water or methylene iodide.

EXAMPLE 2

In this example, the oxygen concentration at the surface of the irradiated portion of the alignment film is increased by irradiating the alignment film with ultraviolet rays. Due to the increase of the oxygen concentration, the surface energy of the alignment film is increased, so that the pretilt angle of the liquid crystal molecules which are in contact with the alignment films is decreased.

Accordingly, as in the method described in Example 1, portions having different pretilt angles are formed in the alignment film. After this, the substrates 31 and 32 are arranged so that the portions having different oxygen concentrations at the surface thereof face each other. Then, by filling a gap between the substrates 31 and 32 with the liquid crystal, two liquid crystal regions having different reference orientation directions which are opposite each other are formed in one picture element. Therefore, the reference viewing directions which are different from each other by 180° are mixedly obtained, resulting in a more improved viewing performance.

The phenomenon in which the oxygen concentration at the surface in the irradiated portion of the alignment film can easily be confirmed by surface elemental analysis such as XPS.

EXAMPLE 3

In this example, the concentration of carbonyl radicals at the surface of the irradiated portion of the alignment film is increased by irradiating the alignment film with ultraviolet rays. Due to the increase of the concentration of carbonyl radicals, the polarity of the alignment film surface is changed, so that the pretilt angle of the liquid crystal molecules which are in contact with the alignment films is decreased.

Accordingly, as in the method described in Example 1, portions having different pretilt angles are formed in the alignment film. After this, the substrates 31 and 32 are arranged so that the portions having different concentrations of carbonyl radicals face each other. By filling the gap between the substrates 31 and 32 with the liquid crystal, the reference orientation directions which are opposite each other can be formed in one picture element in Example 3. Therefore, the reference viewing directions which are opposite each other are mixedly obtained, resulting in a more improved viewing performance.

The phenomenon in which the concentration of carbonyl radicals at the surface in the irradiated portion of the alignment film can easily be confirmed by surface infrared-ray absorption such as FTIR.

Figure 2:
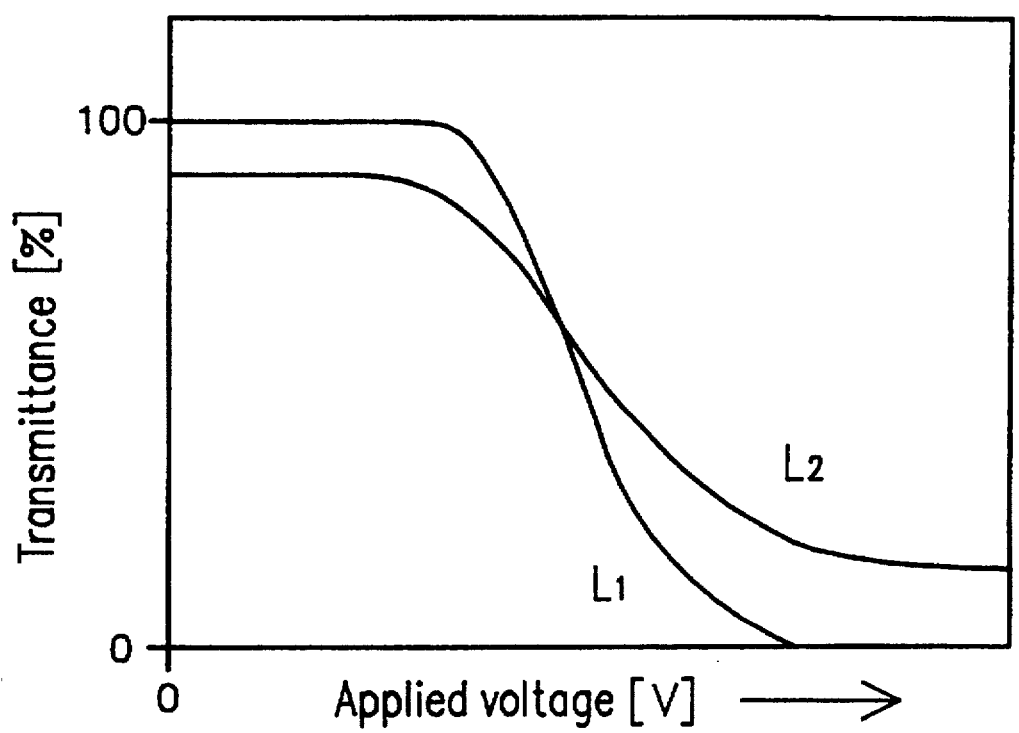
FIG. 2 shows the voltage-transmittance curves depending on viewing directions of the LCD according to Example 1.

FIG. 2 shows the viewing characteristics of the LCD including the alignment films obtained by a method in Example 1, 2 or 3. In FIG. 2, the horizontal axis indicates the applied voltage, and the vertical axis indicates the transmittance. As is understood from this figure, the inversion phenomenon does not occur in the cases according to the invention, so that a good display can be performed.

In Examples 1 to 3, one picture element is divided into two regions, so that the pretilt angle of the substrate 31 is larger than that of the substrate 32 in the left half and the pretilt angle of the substrate 32 is larger than that of the substrate 31 in the right half. However, the present invention is not limited to this specific case, as long as the facing portions are arranged so as to have different surface tensions, different oxygen concentrations, or different concentrations of carbonyl radicals. If the facing regions are formed so as to have different pretilt angles between the substrates 31 and 32 by the use of a difference in surface tension, it is preferred that the difference in surface tension be, for example, 2 dyn/cm or more. If the facing regions are formed so as to have different pretilt angles by the use of a difference in oxygen concentration, it is preferred that the difference in oxygen concentration be set, for example, such that the atomic percentage of a lower concentration region is 70% or less of that of a higher concentration region in a region having a depth of about 100 angstroms from the surface. If the facing regions are formed to have different pretilt angles by the use a difference in the concentration of carbonyl radicals, it is preferred that the difference in the concentration of the carbonyl radicals be set so that the difference can be observed by monitoring the peak of new carbonyl radicals generated by light irradiation in the vicinity of 1700 $cm^{-1}$, for example, when the measurement is performed using FTIR.

In the construction shown in FIG. 1A, regions having different pretilt angles are provided to both substrates. However, the present invention is not limited to this case. Alternatively, regions having a plurality of pretilt angles may be formed on one of the substrates, and regions having an intermediate pretilt angle may be formed on the other substrate. In such a case, the number of process steps can be reduced, so that the production cost can be reduced.

In the above description, regions having different pretilt angles are provided for one pixel electrode, i.e., for one picture element. However, the present invention is not limited to this specific case. Alternatively, regions having different pretilt angles may be provided for every two or more picture elements, or for picture elements the number of which is determined at random.

In addition, there are various possible patterns for different aligning conditions. For example, on the surface of each of the alignment film 31b on the substrate 31 side and the alignment film 32b on the substrate 32 side, two types of portions are alternately formed by the method described in Example 1, 2 or 3. At this time, each of the portions has substantially the same area as that of one picture element.

Figure 19:
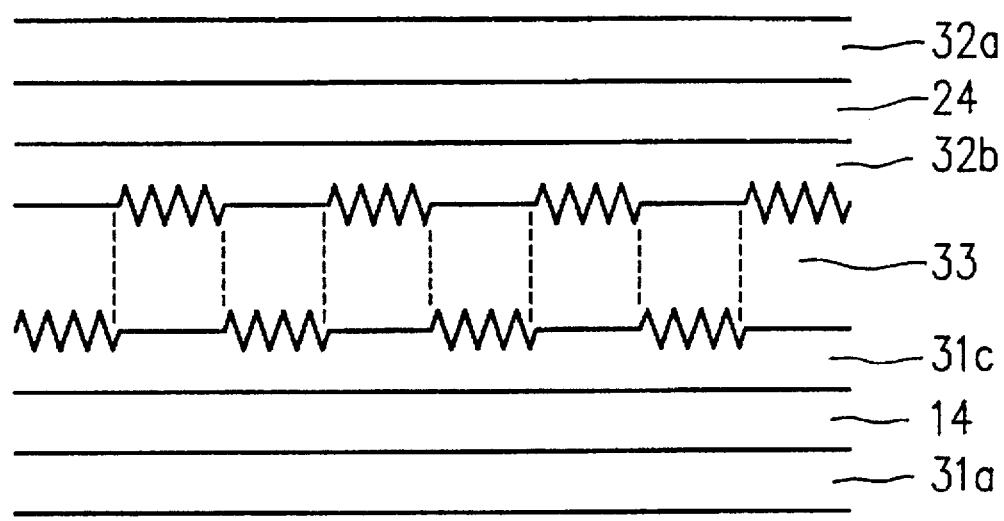
FIG. 19 shows an exemplary pattern of the portions in which the aligning conditions are different.
Figure 20:
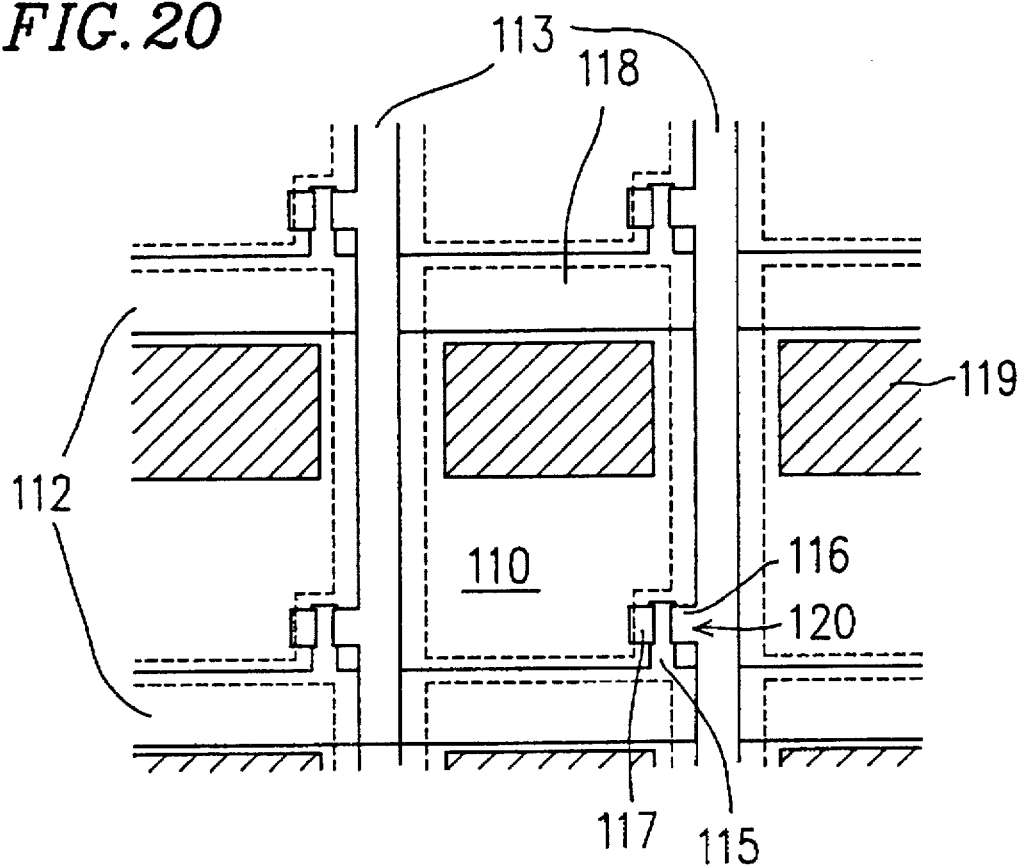
FIG. 20 is a plan view showing a conventional LCD.
Figure 21A:
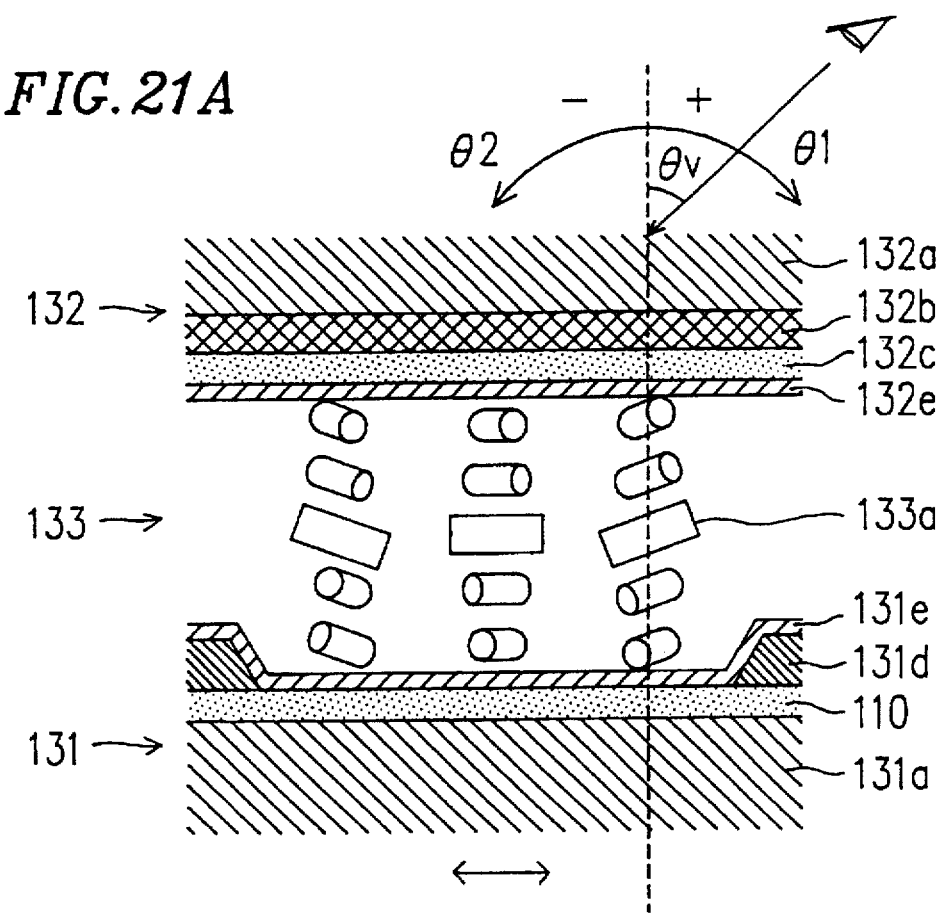
FIG. 21A is a cross-sectional view of the LCD shown in FIG. 20.
Figure 21B:
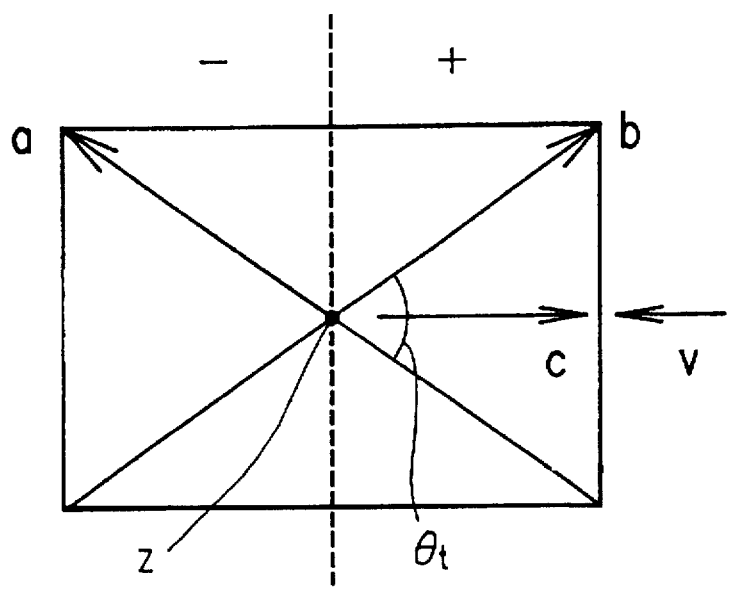
FIG. 21B shows the relationship between the orientation direction of liquid crystal and the rubbing direction.
Figure 22:
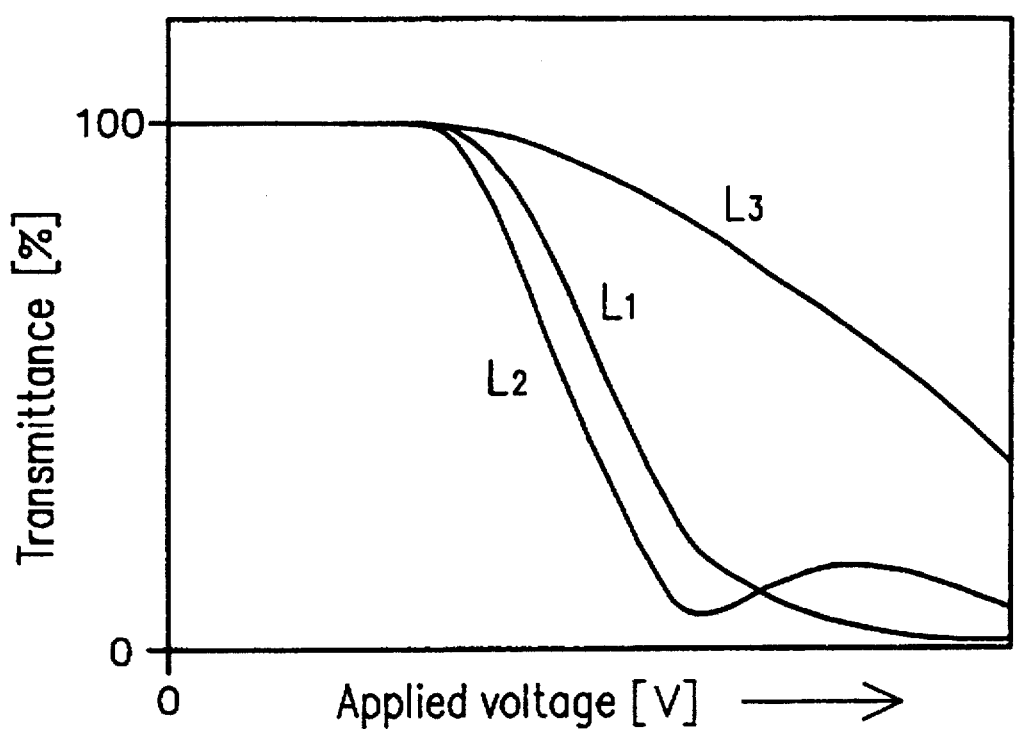
FIG. 22 shows the applied voltage to transmittance characteristics in a conventional normally white mode LCD.
Figure 23A:
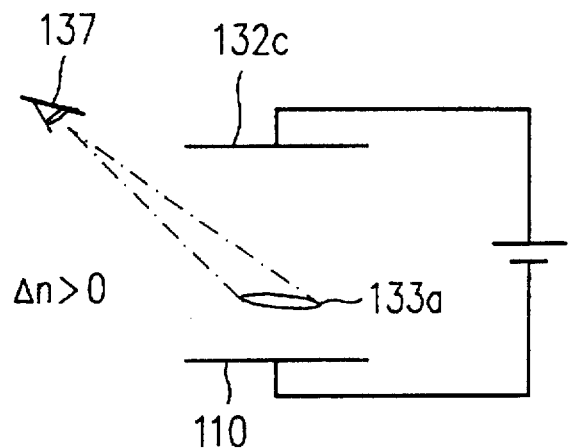
FIGS. 23A, 23B and 23C are diagrams for illustrating the inversion phenomenom in an LCD.
Figure 23B:
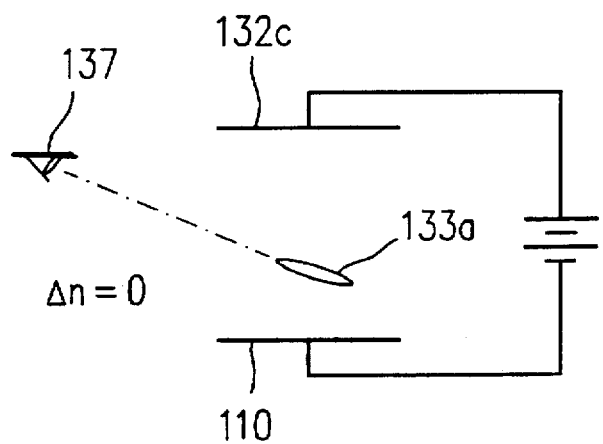
Figure 23C:
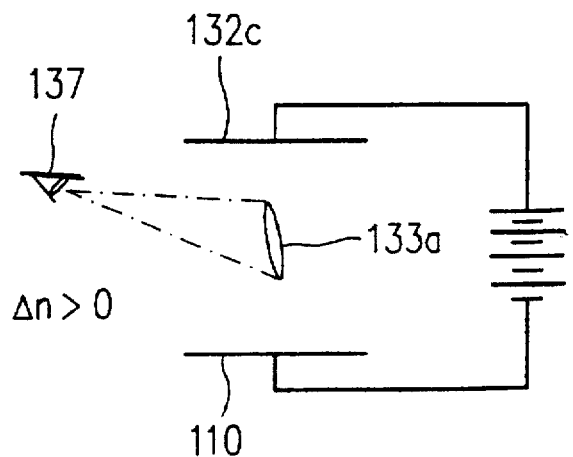

Next, as shown in FIG. 19, the substrates 31 and 32 are assembled by aligning the boundaries between different aligning conditions with each other, so that the portions of different aligning conditions of the alignment film 31b and the alignment film 32b face each other. As a result, as described in Example 1, when the aligning conditions are made different by utilizing the surface tensions, a liquid crystal layer region in which the surface tension of the alignment film 32b is larger than that of the alignment film 31b, and a liquid crystal layer region in which the surface tension of the alignment film 31b is larger than that of the alignment film 32b are alternately formed for each picture element.

As described in Example 2, when the aligning conditions are made different by increasing the oxygen concentration, a liquid crystal layer region in which the oxygen concentration of the alignment film 31b is larger than that of the alignment film 32b and a liquid crystal layer region in which the oxygen concentration of the alignment film 32b is larger than that of the alignment film 31b are alternately formed for each picture element.

As described in Example 3, when the aligning conditions are made different by increasing the concentration of carbonyl radicals, a region in which the concentration of carbonyl radicals of the alignment film 31b is higher than that of the alignment film 32b, and a region in which the concentration of carbonyl radicals of the alignment film 32b is higher than that of the alignments film 31b are alternately formed for each picture element.

In the above description, two types of regions having different pretilt angles are provided for each picture element. However, the present invention is not limited to this specific case. Alternatively, three or more types of regions having pretilt angles may be provided for each picture element.

In the above description, the alignment film is irradiated with ultraviolet rays. However, the present invention is not limited to this specific case. Alternatively, the irradiation can be performed with light including the ultraviolet rays.

In the above description, polyimide is used as the material of the alignment film. Alternatively, any other material can be used so far as the material can attain the construction of the invention by the light irradiation. At this time, an optimal wave-length of irradiation light can be selected depending on the employed material. If a laser is used, the control can be performed more effectively.

According to the invention, instead of the above-described method in which the alignment film is formed over the entire face and then partially irradiated with light, another method can be adopted, in which an alignment film is partially formed using photolithography or the like, and irradiated with light, and then, the remaining part of the alignment film is formed by the photolithography or the like.

The present invention is applicable to an LCD having any other construction, or of any other mode in addition to the above-described active matrix type LCD.

EXAMPLE 4

Examples 4 to 6 describe exemplary cases where the deterioration in contrast due to the disclination line caused when the regions having reference orientation directions opposite each other are formed in one picture element is prevented.

Figure 3:
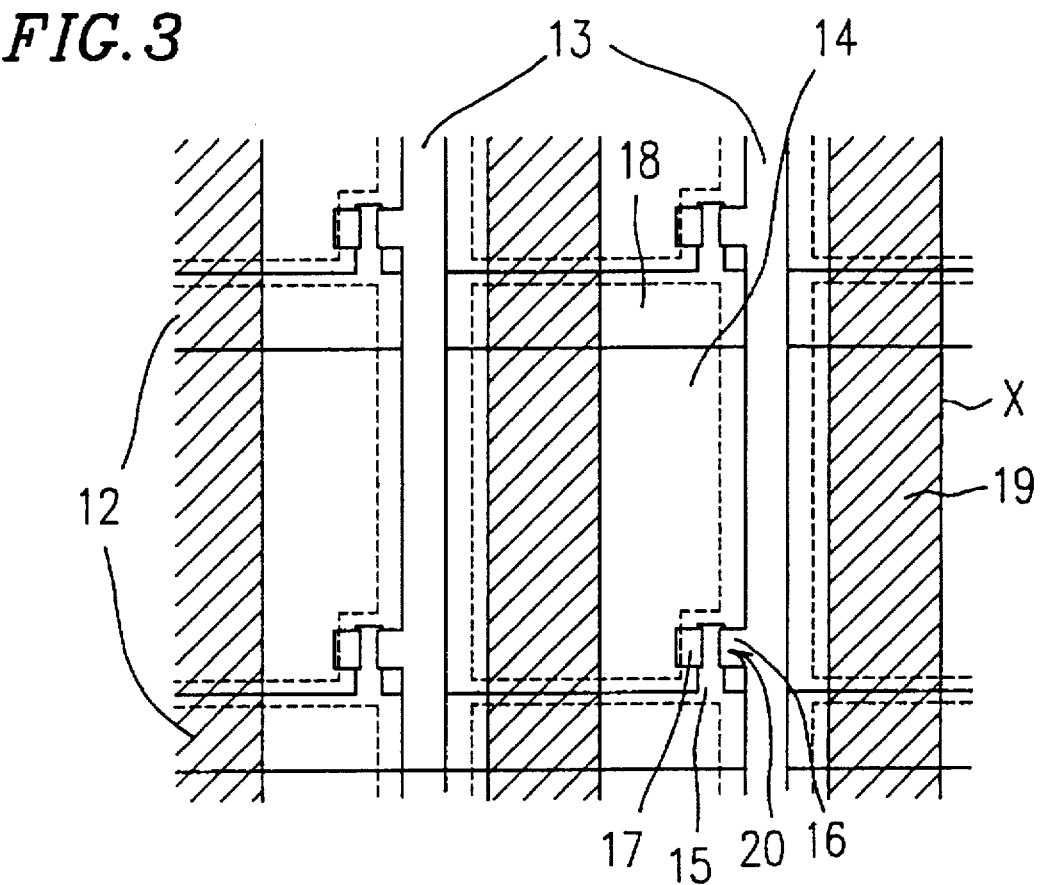
FIG. 3 is a plan view showing an LCD according to Example 4 of the invention.
Figure 4:
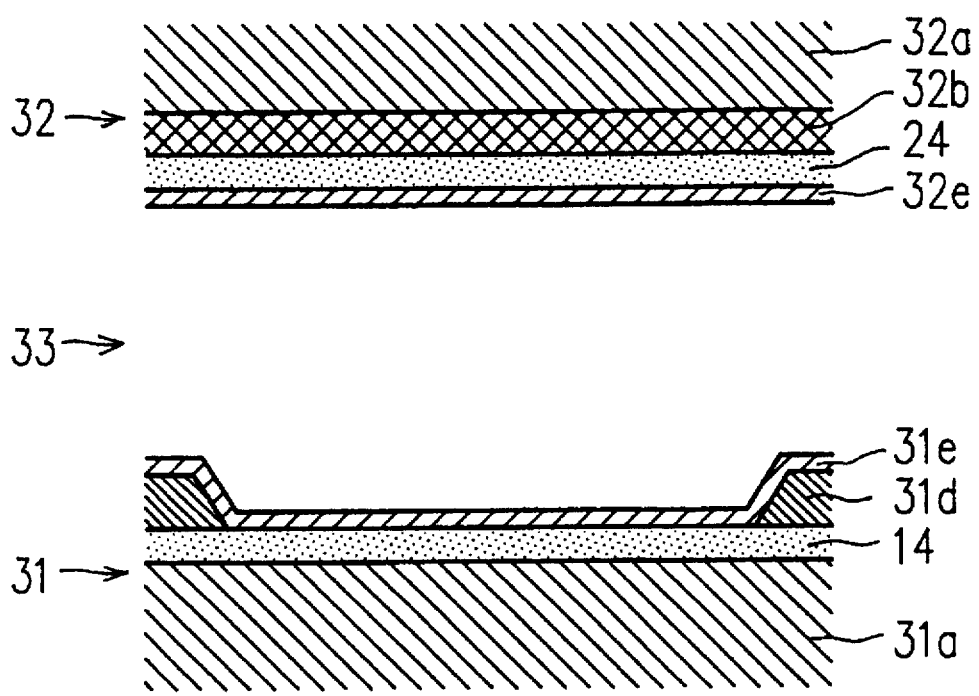
FIG. 4 is a cross-sectional view of the LCD shown in FIG. 3.

FIG. 3 is a plan view showing one example in which the present invention is applied to the TN mode active matrix type LCD. FIG. 4 is a cross-sectional view thereof. In the LCD, as is shown in FIG. 4, an active matrix substrate 31 is disposed so as to oppose a counter substrate 32, and a liquid crystal layer 33 is sealed therebetween. In the active matrix substrate 31, a plurality of scanning lines 12 and a plurality of signal lines 13 are formed so as to cross each other on an insulating substrate 31a made of glass. In each of the areas defined by the scanning lines 12 and the signal lines 13, a pixel electrode 14 is disposed. In the vicinity of each of the crossings of the scanning lines 12 and the signal lines 13, a thin film transistor 20 (hereinafter referred to as a TFT) as a nonlinear element having a switching function is formed. The TFT 20 is electrically connected to one of the scanning lines 12, one of the signal lines 13, and the corresponding pixel electrode 14. The TFT 20 includes a gate electrode 15, a source electrode 16 and a drain electrode 17. The gate electrode 15 is branched from the scanning line 12 on one side of the pixel electrode 14. The source electrode 16 is branched from the signal line 13 toward the pixel electrode 14, and the drain electrode 17 is branched from the pixel electrode 14 toward the source electrode 16. As the TFT 20, an amorphous silicon TFT is employed in this example. The TFT 20 can be formed on the scanning line 12.

On the pixel electrode 14, there is superposed a scanning line 12 which is adjacent to the scanning line 12 including the TFT 20 connected to the pixel electrode 14. The superposed portion constitutes an additional capacitance 18. In an alternative case, an additional capacitance line (not shown) is formed separately from the scanning line 12. In such a case, the additional capacitance 18 can be formed on the additional capacitance line.

Above these electrode lines, that is, above the scanning lines 12 and the signal lines 13, and above the TFTs 20, an insulating protective film 31d is formed in order to prevent short-circuits between the counter substrate 32 and these electrode lines and the TFTs and between the TFTs and the electrode lines. The insulating protective film 31d can be formed so as to have openings corresponding to respective pixel electrodes 14.

In the counter substrate 32 which faces the active matrix substrate 31 having the above-described structure, a color filter 32b, a counter electrode 24, and an alignment film 32e are formed on the insulating substrate 32a in this order.

When the following process steps are performed for the LCD of this example having the above construction, an LCD which can actually be driven to display can be produced. Specifically, the LCD which can actually be driven to display is produced by the step for forming alignment films 31e and 32e on the active matrix substrate 31 and the counter substrate 32, respectively, the step for performing a rubbing treatment for the alignment film 31e, the step for attaching the active matrix substrate 31 to the counter substrate 32, the step for providing a liquid crystal layer 33 by injecting liquid crystals between the substrates 31 and 32, and other steps, and then a step for mounting peripheral circuits such as a drive circuit.

In the production process, some process steps for providing a plurality of liquid crystal layer regions having different reference orientation directions in one picture element are performed. In this example, an aligning treatment is performed for the alignment film 31e of the active matrix substrate 31, so as to form a liquid crystal layer region 19 in which the reference orientation direction is different from the other region over two or more picture elements while two reference orientation directions exist in one picture element. In other words, the reference orientation direction of the liquid crystal layer region 19 is reversed from the reference orientation direction of the other region.

Such aligning conditions can be realized by performing the aligning treatment in a state where a protective film is formed on one of two liquid crystal layer regions with different reference orientation directions, by removing the protective film, by performing another aligning treatment in a state where another protective film is formed on the other liquid crystal layer region, and then by removing the protective film. In an alternative case, a region of the surface of the pixel electrode 14 is chemically changed by using liquid such as an acidic or alkaline solution, so as to make the surface rough. Thus, the reference orientation directions (the in-plane directions of the liquid crystal molecules at a middle position along the thickness direction of the liquid crystal layer 33) are controlled by utilizing the difference in pretilt angles between the rough region and the flat region. As a method for making the surface rough, the surface may be chemically changed by plasma, or electromagnetic waves including light, or the surface may be physically changed by solid, gas, plasma, or electromagnetic waves including light.

Alternatively, the liquid crystal layer regions having different reference orientation directions are formed by using a method described in Example 1, 2 or 3.

In the case where the insulating film is formed above the electrode lines and the TFTs, in order to prevent short-circuits between the substrates and between the electrode lines, the insulating film surface is treated so as to chemically change the surface condition by using liquid such as an acidic or alkaline solution, gas, plasma, or electromagnetic waves including light, or the like, or so as to physically change the surface condition by using solid, gas, plasma, electromagnetic waves including light, or the like. As a result, the in-plane directions of the liquid crystal molecules at the middle position of the liquid crystal layer 33 can be controlled by controlling the pretilt angles or the aligning directions.

Accordingly, in this example, two liquid crystal layer regions having the reference orientation directions which are different from each other in one picture element are formed over two or more picture elements. Therefore, the boundary X (as shown in FIG. 4) of liquid crystal regions with different reference orientation directions is positioned over two or more picture elements. As a result, the free energy included in the boundary is reduced, so that the possibility that one aligning condition is absorbed by the other aligning condition can be avoided. In this way, the anisotropy of refractive indices of liquid crystal molecules is not lost, and it is possible to ensure the optical rotatory power of light. As a result, the viewing angle dependence can be eliminated.

In the above-described example, the aligning treatment is performed for the alignment film 31e of the active matrix substrate 31. Alternatively, the aligning treatment may be performed only for the alignment film 32e of the counter substrate 32, or for both the alignment films 31e and 32e of the substrates 31 and 32. In such cases, it is possible to eliminate the viewing angle dependence.

Figure 5:
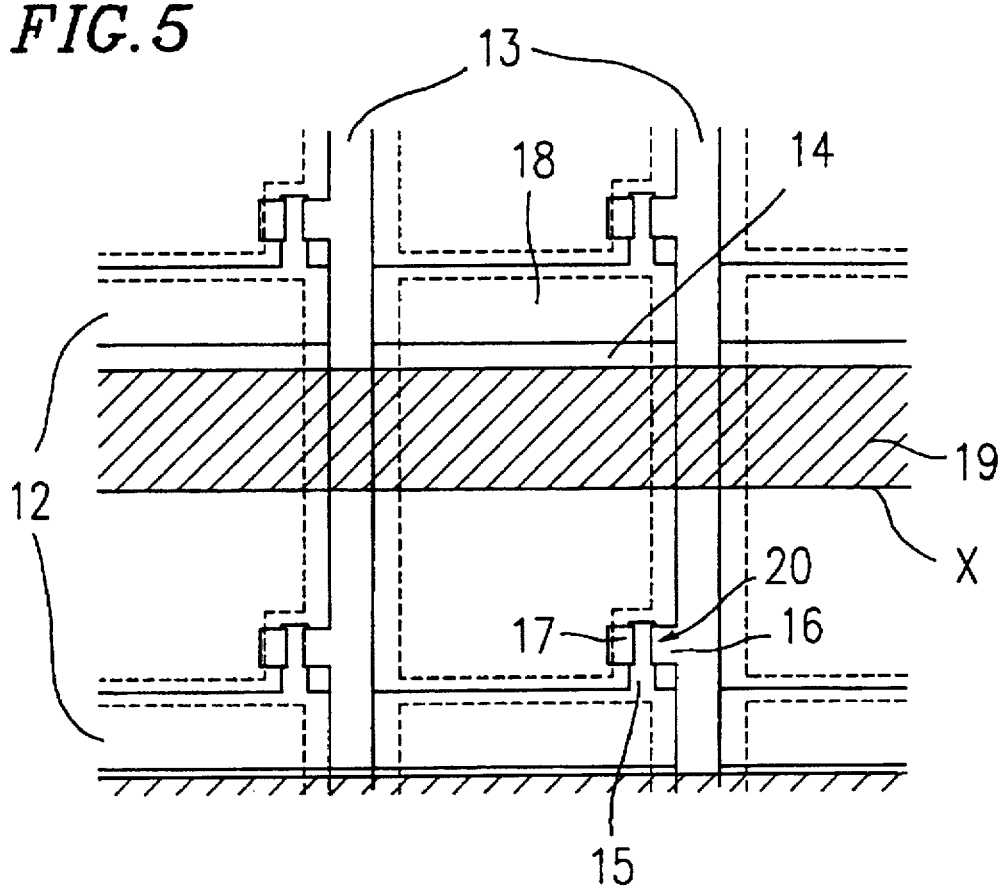
FIG. 5 is a plan view showing another LCD according to Example 4.

In this example, the boundary X between the liquid crystal layer regions with different reference orientation directions is set so as to be parallel to the signal lines 13. This invention is not limited to this specific setting. Alternatively, the boundary X between the liquid crystal layer regions with different orientation directions may be set so as to be parallel to the scanning lines 12, as is shown in FIG. 5. In such a case, it is possible to eliminate the viewing angle dependence for the above-described reasons of the above examples.

In this example, two liquid crystal layer regions having different reference orientation directions in one picture element are formed over two or more picture elements. This invention is not limited to this specific case. Alternatively, three or more liquid crystal layer regions having different reference orientation directions in one picture element may be provided over two or more picture elements.

In addition, it is sufficient for the boundary between the liquid crystal layer regions with different reference orientation directions to exist over two or more picture elements. Accordingly, it is unnecessary that the boundary continues over all the picture elements in one column among the picture elements disposed in a matrix. In some cases, the boundary may be divided in one column.

EXAMPLE 5

Another example of the invention will be described.

Figure 6:
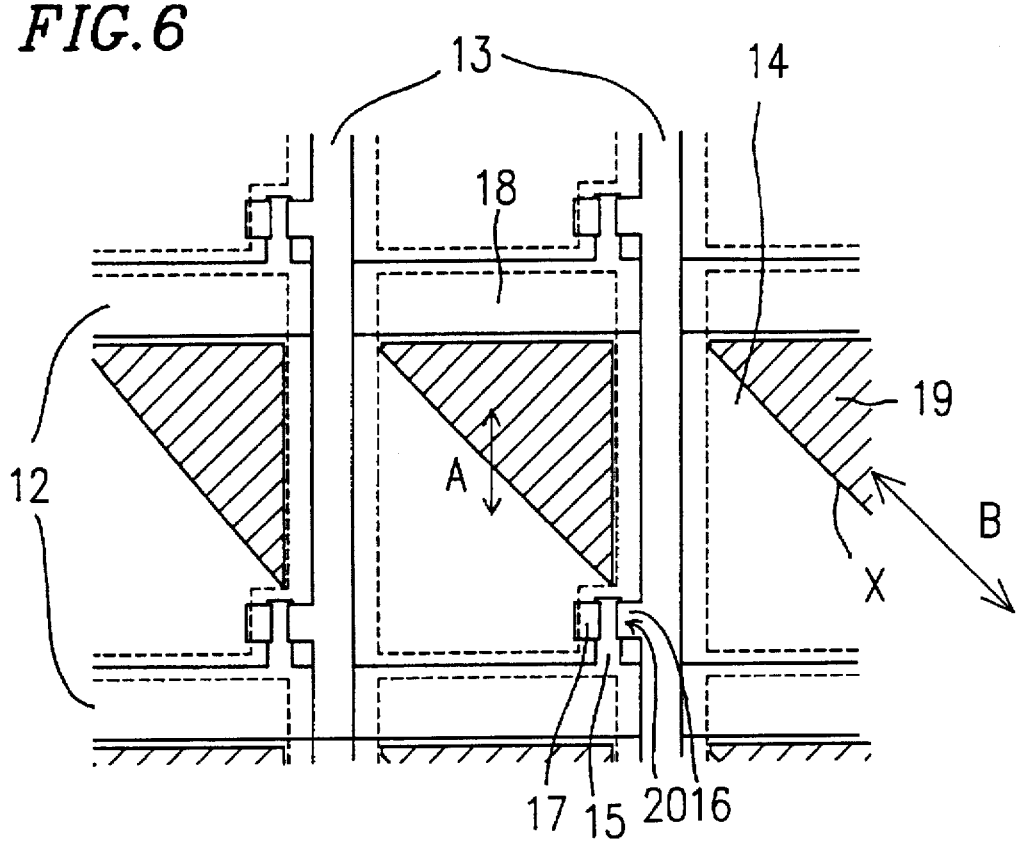
FIG. 6 is a plan view showing an LCD according to Example 5 of the invention.
Figure 7:
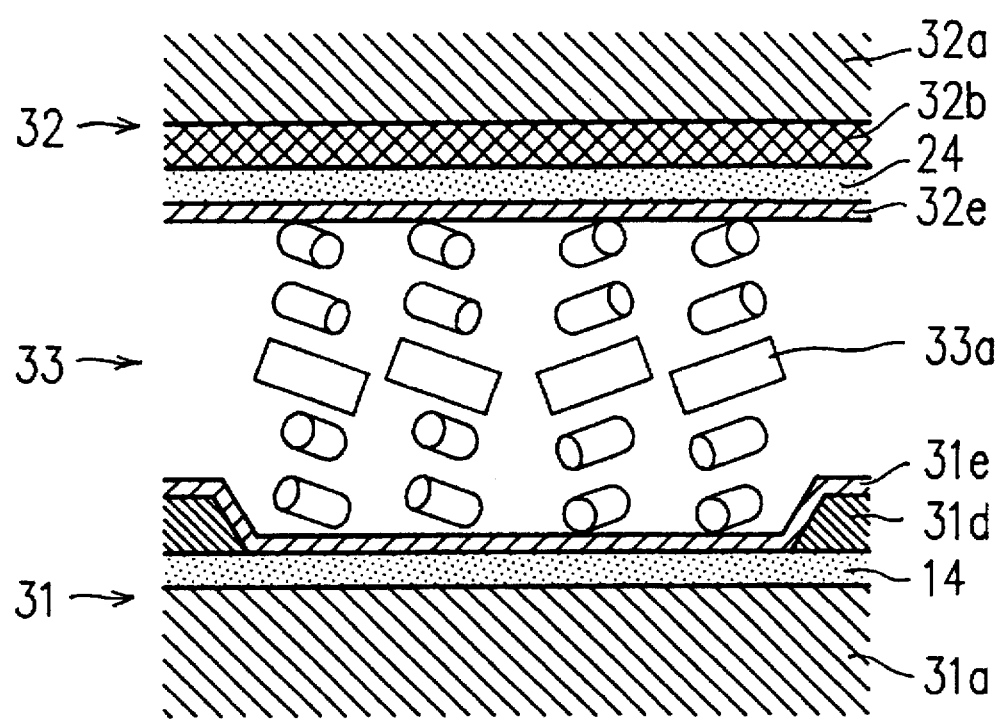
FIG. 7 is a cross-sectional view of the LCD shown in FIG. 6.

FIG. 6 is a plan view showing an LCD of Example 5. FIG. 7 is a cross-sectional view along the direction A in FIG. 6. Like components are indicated by like reference numerals to those in FIGS. 3 and 4.

In this LCD, two liquid crystal layer regions (one is indicated by the reference numeral 19) with different reference orientation directions are formed so that both regions exist in each picture element. That is, one of the two liquid crystal regions is shown as a hatched region, and the other region is shown as a region without hatching. The alignment treatment for obtaining such aligning conditions are performed on the alignment film 31e of the active matrix substrate 31. The two liquid crystal layer regions with different reference orientation directions are positioned in such a manner that the boundary therebetween is parallel to the aligning direction (the direction B) of the liquid crystal molecules which are in contact with the alignment film 31e of the active matrix substrate 31. In order to realize such aligning conditions, the same aligning treatment as in the above example can be adopted.

As described above, in this LCD, the boundary X between the two liquid crystal layer regions with different reference orientation directions is parallel to the aligning direction (the direction B) of the liquid crystal molecules which are in contact with the alignment film 31e of the active matrix substrate 31. Accordingly, the disorder of the liquid crystal alignment which results in the above-mentioned occurrence of the disclination line can be suppressed.

In this example, the above-described aligning conditions are formed on the alignment film 31e of the active matrix substrate 31. Alternatively, the aligning conditions can be formed only on the alignment film 32e of the counter substrate 32, or on both the alignment films 31e and 32e of the substrates 31 and 32. In the former case, it is necessary to set the boundary X to be parallel to the aligning direction of liquid crystal molecules which are in contact with the alignment film 32e of the counter substrate 32. In the latter case, the boundary X may be set so as to be parallel to the aligning direction of liquid crystal molecules which are in contact with either of the alignment film 31e of the active matrix substrate 31 or the alignment film 32e of the counter substrate 32.

Figure 8:
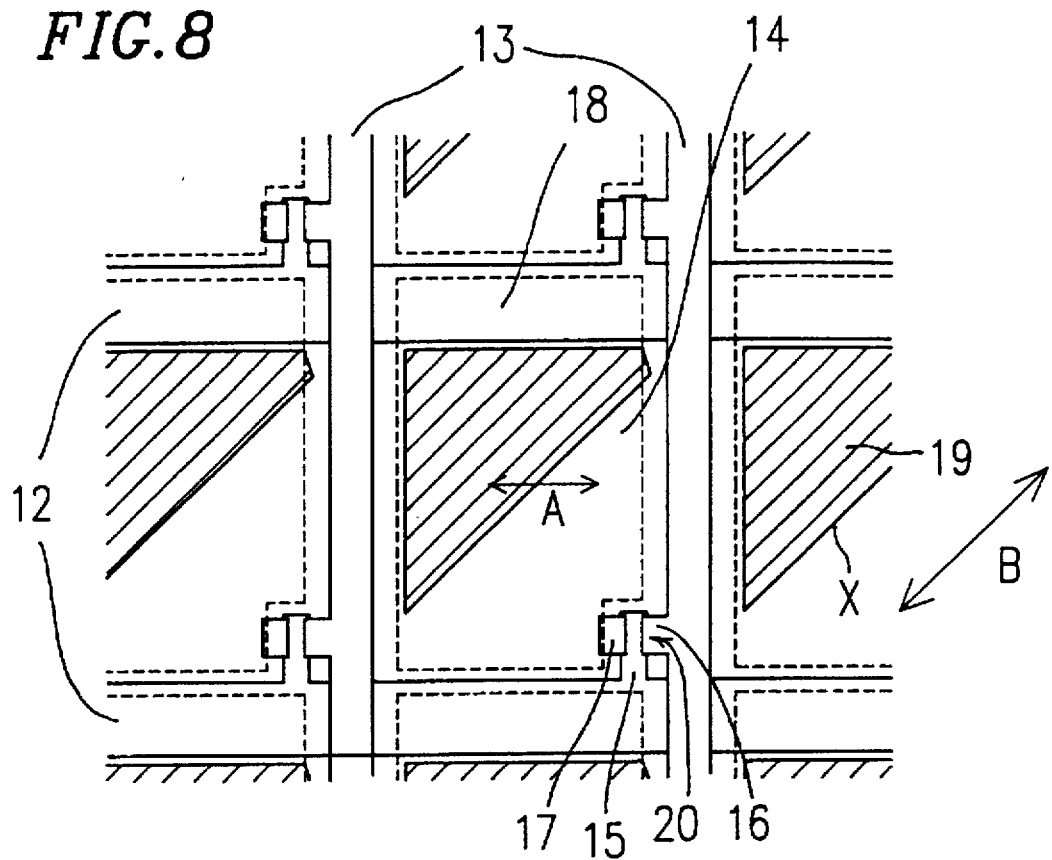
FIG. 8 is a plan view showing another LCD according to Example 5.

If the aligning direction (the direction B) is different from that in the above-described case, as is shown in FIG. 8, the two liquid crystal layer regions with different reference orientation directions may be formed so that the boundary X therebetween is set to be parallel to the aligning direction of the liquid crystal molecules which are in contact with the alignment film.

In the above cases, as is shown in FIGS. 6 and 8, the boundary X is formed from one of the horizontally adjacent sides to the other, or from one of the vertically adjacent sides to the other side of the display panel of the LCD. The invention is not limited to these specific patterns. The boundary X extending from one side does not necessarily reach the other side. Alternatively, the boundary X may divide each side.

Figure 9:
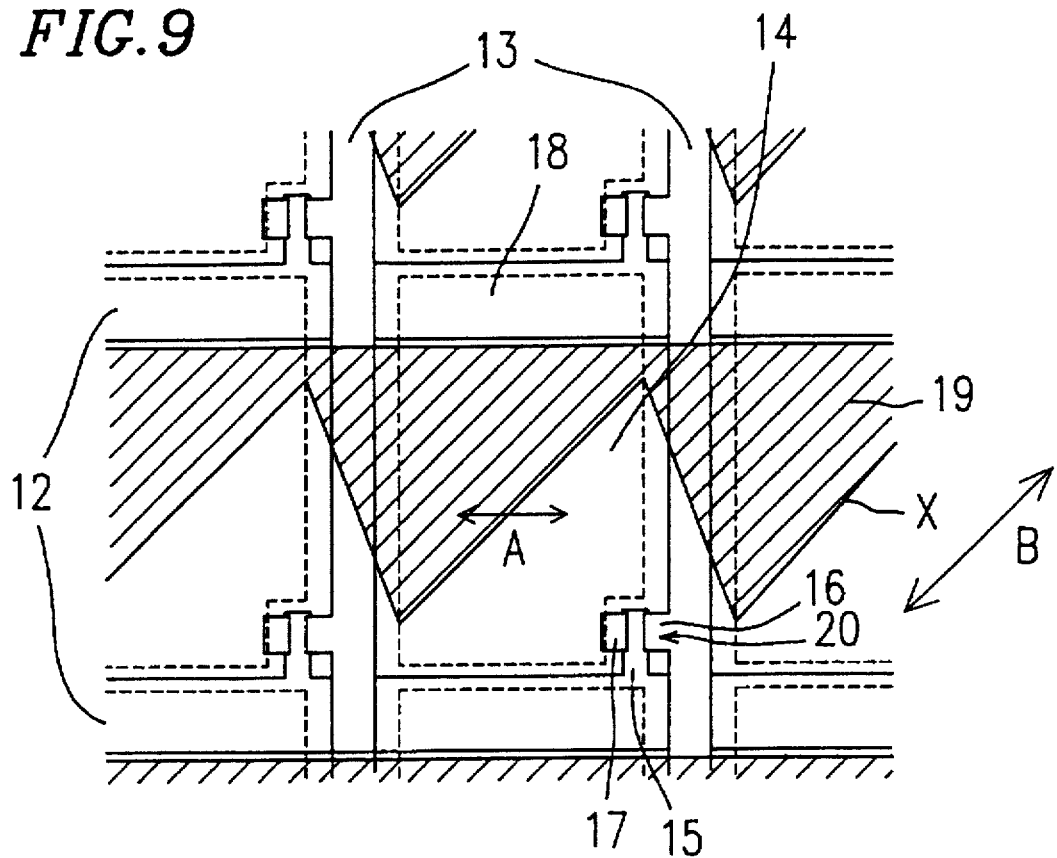
FIG. 9 is a plan view showing still another LCD according to Example 5.

In addition, the two liquid crystal layer regions with different aligning directions are formed in each separate picture element. The invention is not limited to this specific case. Alternatively, as is shown in FIG. 9, the two liquid crystal layer regions may be formed over successive picture elements. In such a case, on a portion corresponding to the picture element, the boundary X between the two liquid crystal layer regions with different reference orientation directions should be set so as to be parallel to the aligning direction (the direction B). In other words, in portions other than picture elements, the aligning directions of the liquid crystal molecules at the middle position along the thickness of the liquid crystal layer 33 hardly affect the display, so that the boundary X between the two liquid crystal layer regions with different reference orientation directions in the portions other than the picture elements is not necessarily parallel to the aligning direction (the direction B) of the liquid crystal molecules. In order to realize such aligning conditions, the same treatment as in the previous example can be adopted.

Moreover, in the case of the active matrix type LCD having the TFT 20 of a nonlinear element between the picture element and the signal line, if the boundary X between the two liquid crystal layer regions with different reference orientation directions is positioned farthest from the nonlinear element as is shown in FIG. 8, it is possible to prevent the deterioration of the nonlinear element during the treatment for making the surface rough.

In Example 5, it is appreciated that three or more liquid crystal layer regions with different orientation directions are formed in one picture element, and the respective boundaries are set so as to be parallel to the aligning direction of the liquid crystal molecules which are in contact with one of the substrates.

EXAMPLE 6

In this example, two or more liquid crystal layer regions with different orientation directions are formed, and a light blocking film is formed on each boundary, so that the light leaked from the boundary portion is blocked by the light blocking film. In this case, it is unnecessary to set the boundary to be parallel to the aligning direction of the liquid crystal molecules which are in contact with one of the substrates.

Figure 10:
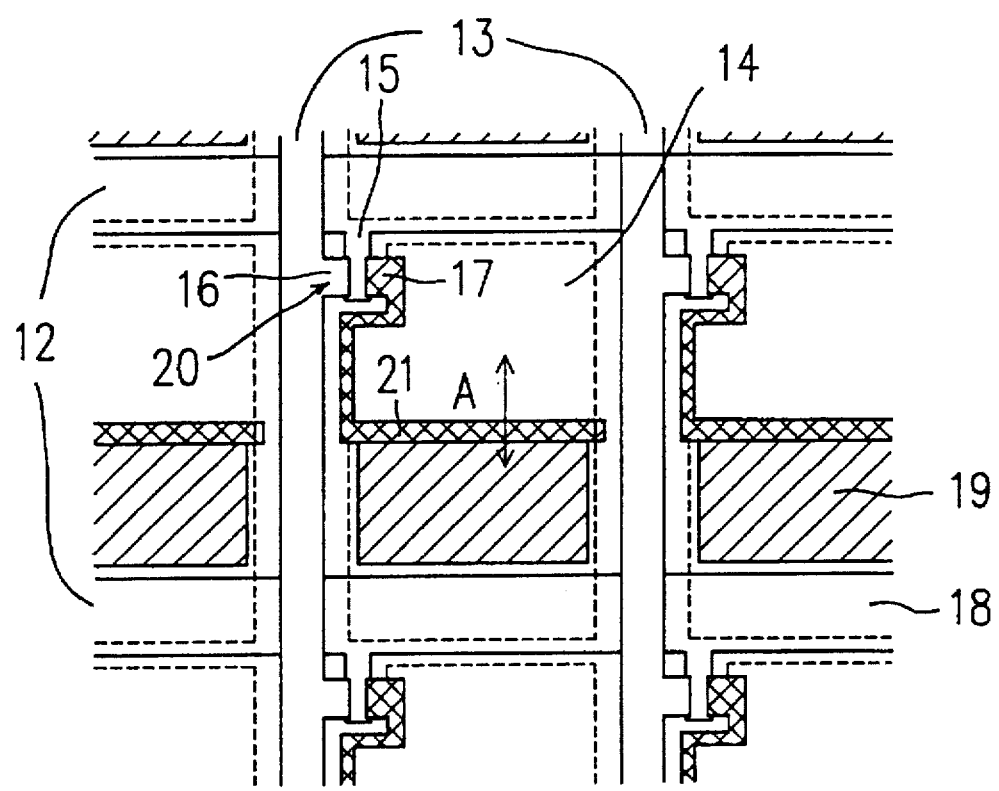
FIG. 10 is a plan view showing an LCD according to Example 6 of the invention.
Figure 11:
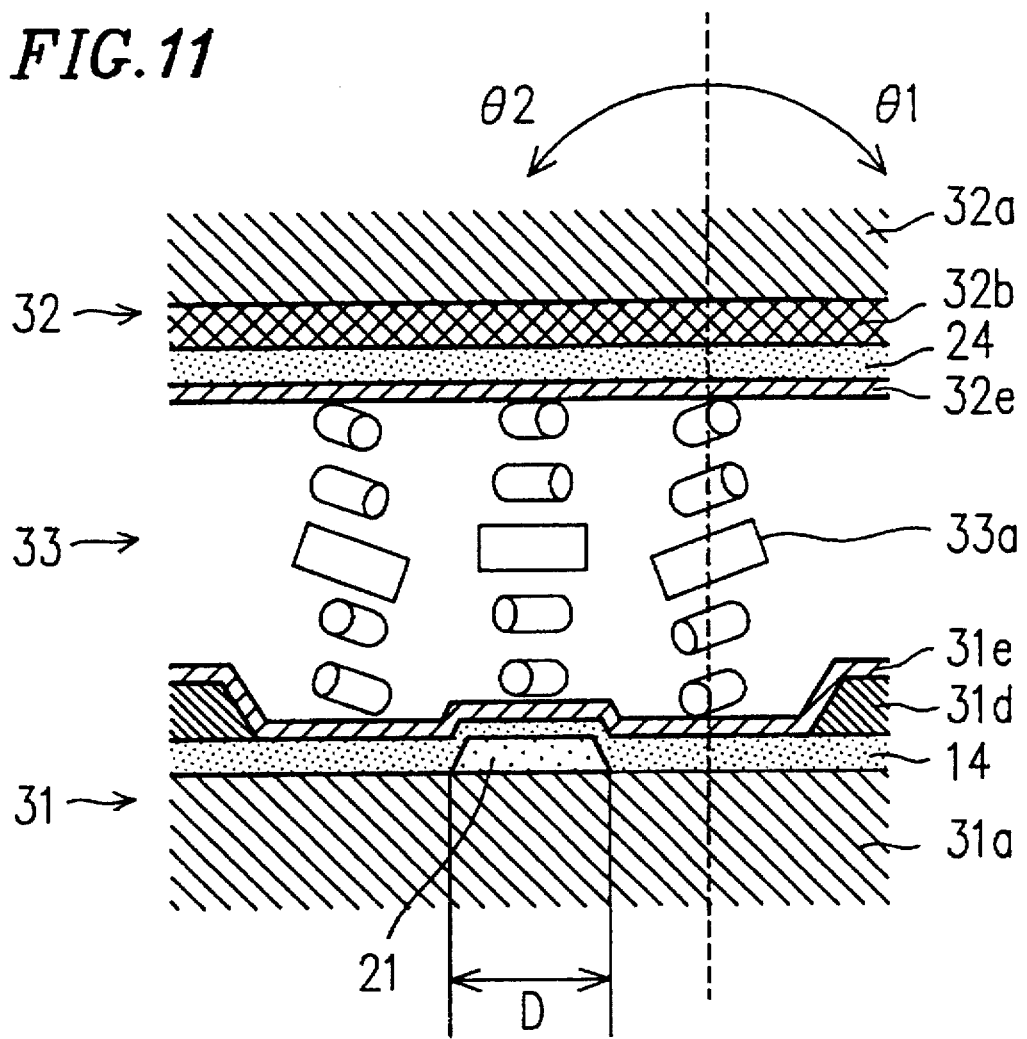
FIG. 11 is a cross-sectional view of the LCD shown in FIG. 10.

FIG. 10 is a plan view showing an LCD of this example, and FIG. 11 is a cross-sectional view thereof. In this LCD, the boundary between two liquid crystal layer regions with different reference orientation directions (one is indicated by the reference numeral 19) is covered with a light blocking film 21 which is extended from the drain electrode 17.

Accordingly, in this example, the light leaked from the boundary portion in which any disclination line occurs can be blocked by the light blocking film 21, so that the contrast can be enhanced. The light blocking film is formed of the same material as that of the drain electrode 17 constituting the TFT 20 because the attaching accuracy of the two substrates in the cell assembly process is low. If the light blocking film 21 is separately formed from the TFT 20, a positioning deviation occurs between the light blocking film 21 and the TFT 20 both of which have the light blocking function after the attachment of the substrates. As a result, the opening ratio is reduced on the contrary, if the light blocking film 21 is formed of the same material as the drain electrode 17, the deposition and etching for the drain electrode 17 can be used for the formation of the light blocking film 21. Thus, the number of process steps is not increased as compared with the conventional process.

As shown in FIG. 11, the width D of the light blocking film 21 may be set to be a value with which the light blocking film 21 can block the light leaked from the portion in which the disclination line occurs.

In this example, the light blocking film 21 is formed of the same material as that of the drain electrode 17. Alternatively, the light blocking film 21 may be formed of the same material as any electrode or the like having the light blocking function constituting the TFT 28. In such a case, the same effects can be attained.

Figure 12:
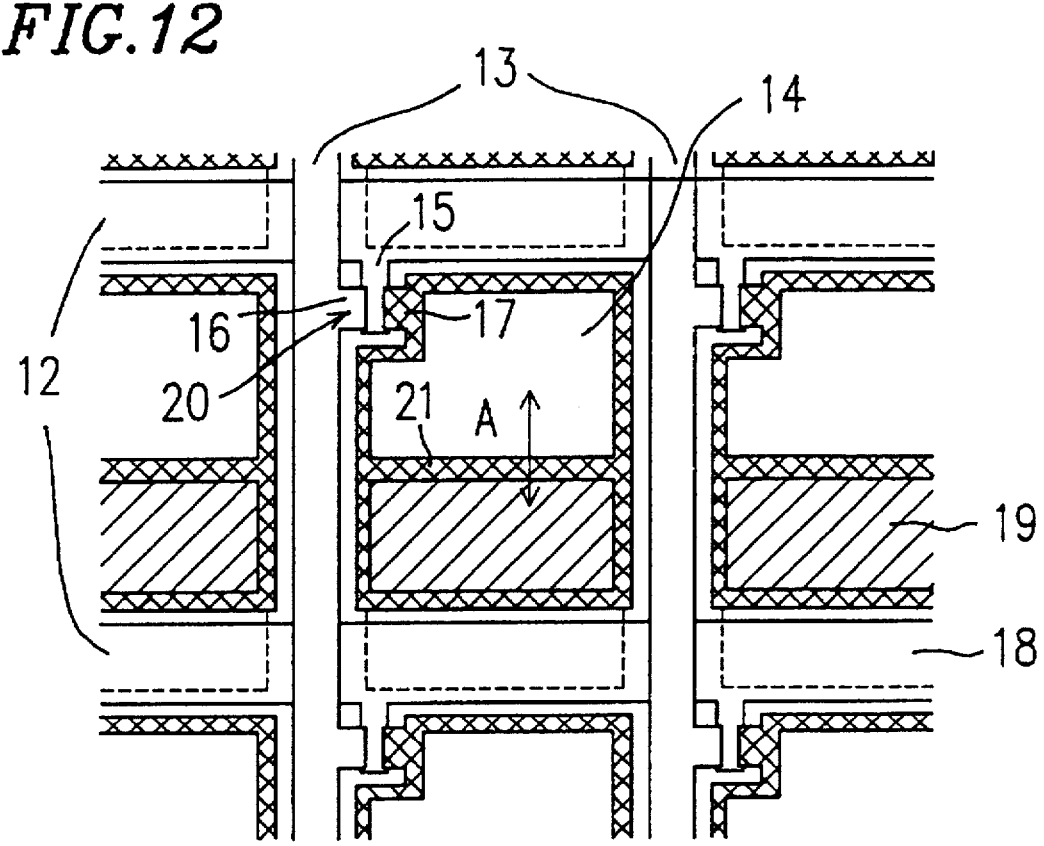
FIG. 12 is a plan view showing another LCD according to Example 6.

The light blocking film 21 in this example can be formed so as to cover the entire peripheral portions of the picture elements, as is shown in FIG. 12. Alternatively, the light blocking film 21 may be formed so as to cover the boundary X shown in Examples 1 and 2.

The techniques described in Examples 4, 5 and 6 can also be applied to any LCD of a desired mode and structure, as well as to the LCDs of the above-mentioned modes and structures.

EXAMPLE 7

Example 7 describes a method for producing an LCD with good reproducibility.

Figure 13:
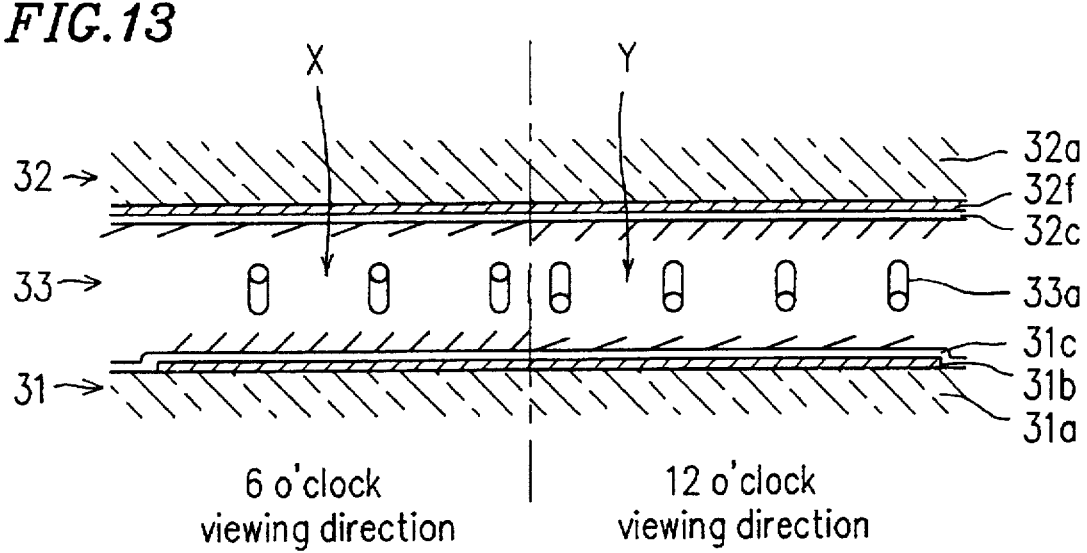
FIG. 13 is a cross sectional view showing an LCD according to Example 7 of the invention.

FIG. 13 is a cross-sectional view showing a simple matrix type LCD to which the present invention is applied. In the LCD, a pair of substrates 31 and 32 are disposed so as to face each other with a liquid crystal layer 33 sandwiched therebetween. In the substrate 31 which is the lower one of the substrates, an electrode layer 31b is formed on a base substrate 31a made of glass, silicon wafer, or the like. On the side which is in contact with the liquid crystal layer 33, an alignment film 31c for defining the alignment of liquid crystal molecules is formed. The electrode layer 31b provided on the substrate 31 is formed in such a manner that a plurality of strip electrodes are juxtaposed.

In the other (upper) substrate 32, an electrode layer 32f is formed on a base substrate 32a made of glass, silicon wafer, or the like. On the side which is in contact with the liquid crystal layer an alignment film 32c for defining the alignment of liquid crystal molecules is formed. The electrode layer 32f provided on the substrate 32 is formed so as to cross the electrode layer 31b on the substrate 31, in such a manner that a plurality of strip electrodes are juxtaposed. The crossing portions of the electrode layers 31b and 32f constitute picture elements.

In the liquid crystal layer 33, liquid crystal layer regions X and Y in which the aligning conditions are different from each other are formed in one picture element. In the region X, the reference viewing direction is set to be the 6 o'clock direction. In the region Y, the reference viewing direction is set to be the 12 o'clock direction. In FIG. 13, short lines extending from the alignment films 31c and 32c represent the liquid crystal molecules which are in contact with the alignment films 31c and 32c, and angles between the short lines and the alignment films 31c and 32c represent the pretilt angles. The tilting of the liquid crystal molecule 33a in the vicinity of the middle position along the thickness direction of the liquid crystal layer 33 indicates the average pretilting direction of the liquid crystal molecules.

The substrates 31 and 32 are sealed at their ends by a resin or the like, and a peripheral circuit such as a driving circuit is externally mounted at the periphery of a display section which performs a display in one of the substrates 31 and 32.

The method for producing the LCD having the above-described construction will be described below.

First, the electrode layers 31b and 32f are formed on the base substrates 31a and 32a by a known method, and the alignment films 31c and 32c are formed thereon. Thereafter, the alignment films 31c and 32c are unidirectionally rubbed with a burnishing cloth or the like.

Figure 14:
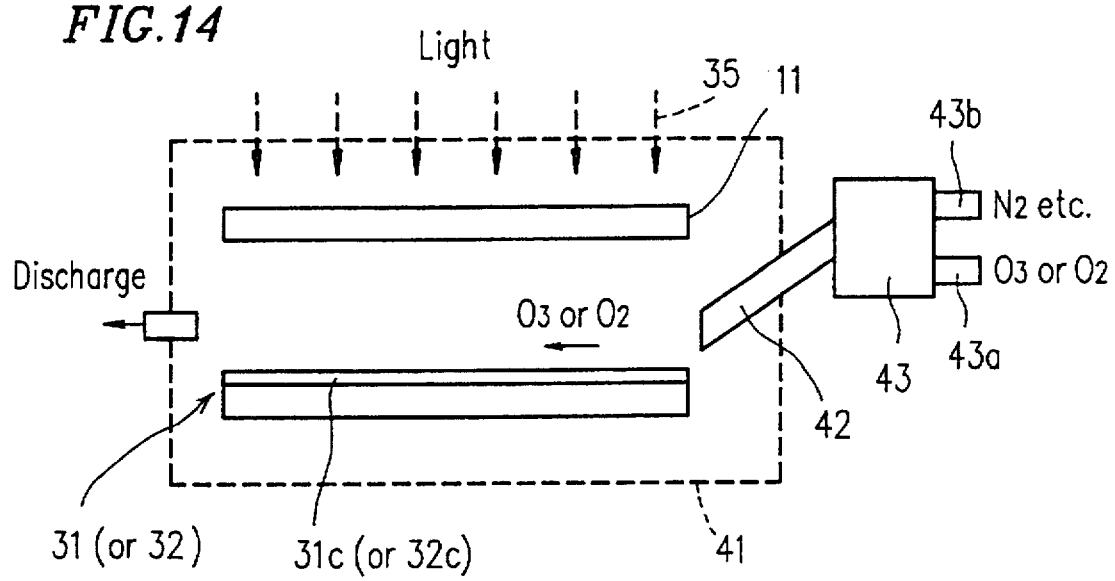
FIG. 14 is a diagram schematically showing an apparatus used for a light irradiation process in a method for producing the LCD according to Example 7.
Figure 15:
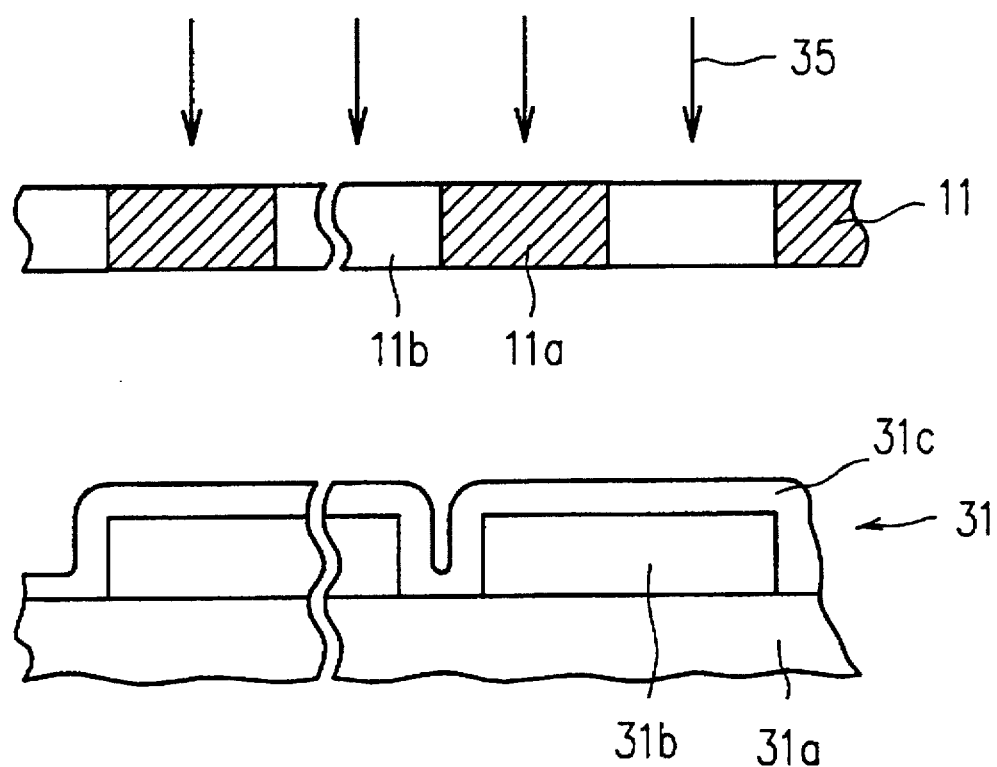
FIG. 15 is a cross-sectional view schematically showing the light irradiation process in the method for producing the LCD according to Example 7.

Next, one of the substrates 31 and 32, e.g., the substrate 31 is located in a chamber 41 of a reaction apparatus shown in FIG. 14 so that the alignment film 31c faces up. On the alignment film 31c, a mask 11 having light blocking portions 11a and light transmitting portions 11b is disposed. As shown in FIG. 15, the mask 11 has a construction in which the light blocking portions 11a are formed entirely and the light transmitting portions 11b are formed therein in a matrix. The mask 11 is disposed in such a manner that the light blocking portion 11a is positioned on a region corresponding to the region X of the electrode layer 31b which constitutes one picture element.

Next, an oxygen gas or an ozone gas is introduced into the chamber 41 via a gas supply port 42 through a mass flow controller 43 to which a supply pipe 43a for selectively supplying an oxygen gas or an ozone gas and a supply pipe 43b for supplying an inert gas such as nitrogen are connected. At this time, the oxygen gas or the ozone gas is preferably introduced so as to come into contact with the alignment film 31c. In some cases, the oxygen gas or the ozone gas may be supplied together with the inert gas. As to the concentration of the introduced oxygen or ozone, the concentration of oxygen when the oxygen gas is introduced is set to be 25 vol % or more, and the concentration of ozone when the ozone gas is introduced is set to be $1 \times 10^{-4}$ vol % or more. If the atmosphere in the chamber 41 is substantially uniform, these prescribed concentrations can be selected in accordance with the atmosphere. If the atmosphere in the chamber 41 is not uniform, these prescribed concentrations can be selected in accordance with the atmosphere in the vicinity of the alignment film 31c. Essentially, the concentrations should be determined so that the concentrations defined in the above ranges can be obtained at least in the vicinity of the alignment film 31c in order for the reaction which will be described below to easily occur at the surface of the alignment film. The supply pipe 43a selectively supplies one of the oxygen gas and the ozone gas from an oxygen source and an ozone source by means of a switching valve which is not shown.

Next, as shown in FIGS. 14 and 15, the alignment film 31c is irradiated with light 35 through the mask 11 from the above. As the light 35, ultraviolet rays can be used. As the result of the light irradiation, the irradiated portion of the alignment film 31c has a surface condition in which the pretilt angle of liquid crystal molecules is decreased.

Accordingly, in the irradiated alignment film 31c, the irradiated portion corresponding to the region Y has a smaller pretilt angle, and the portion which is not irradiated with light (hereinafter, referred to as a non-irradiated portion) corresponding to the region X has a larger pretilt angle.

Next, the other substrate 32 is located in the chamber 41, and the light irradiation is performed in the same manner as described above. At this time, the light blocking portion 11a is positioned on the region corresponding to the region Y of the electrode layer 32b which constitutes one picture element. As the result of the light irradiation, in the alignment film 32c, the irradiated portion corresponding to the region X has a smaller pretilt angle, and the non-irradiated portion corresponding to the region Y has a larger pretilt angle. The light irradiation step for the substrate 32 may be performed prior to the light irradiation step for the substrate 31.

Then, the substrates 31 and 32 are attached to each other in such a manner that the alignment films 31c and 32c face inside. At this time, the substrates 31 and 32 are sealed at their ends. Thereafter, liquid crystal is injected into the gap between the substrates 31 and 32, so as to obtain the liquid crystal layer 33.

In the final step, a peripheral circuit such as a driving circuit is mounted on the periphery outside of the display section which performs a display. Thus, the LCD of this example is completed.

As described above, in this example, when the alignment films 31c and 32c are irradiated with light, the oxygen gas or the ozone gas exists at least in the vicinity of the alignment films 31c and 32c at the oxygen concentration of 25 vol % or more or the ozone concentration of $1 \times 10^{-4}$ vol % or more. This increases the reaction rate. That is, when oxygen existing in the vicinity of the alignment film is irradiated with ultraviolet rays, $O_3$ (ozone) is generated. The $O_3$ oxidizes the alkyl radical of polyimide, so as to produce a carbonyl radical. As a result, the polarity of the alignment film surface is changed. If a larger amount of oxygen or ozone, especially ozone exists in the vicinity of the alignment film, the polarity of the alignment film surface is changed more rapidly. As a result, the surfaces of the alignment films 31c and 32c can be set into the desired aligning conditions in a shorter period. Then, the changed polarity of the alignment film surface changes the pretilt angle of liquid crystal molecules which are in contact with the alignment film surface with changed polarity.

In the case where the pretilt angle of the substrate 31 is different from that of the substrate 32, the in-plane orientation directions of the liquid crystal molecules at a middle position along the thickness direction of the liquid crystal layer 33 are controlled by the alignment film with a larger pretilt angle. Therefore, in the LCD of this example, two regions having reference orientation directions which are opposite to each other are formed in one picture element. Accordingly, the viewing characteristics of two reference viewing directions which are opposite each other are mixedly obtained, so that the inversion phenomenon in the positive viewing direction can be improved, and the contrast can be enhanced.

In this example, as the alignment films 31c and 32c, a polyimide (PI) film which is one of organic polymer films is used. The polyimide type polymer includes a polymer main chain, and the longer chain direction of the polymer main chain in the polyimide film surface is aligned in the rubbing direction as the result of the rubbing treatment. Accordingly, it is considered that the liquid crystal molecules which are in contact with the alignment films 31c and 32c made of polyimide films are aligned in the rubbing direction.

In this example, the oxygen concentration is set to be 25 vol % or more, and the ozone concentration is set to be $1 \times 10^{-4}$ vol % or more. Such concentrations are determined because oxygen or ozone existing in the vicinity of the irradiated portion facilitates the reaction for changing the surface condition of the alignment film caused by the light irradiation. Thus, the reaction rate can be increased. If the concentration is lower than the predetermined one, the reaction for changing the surface condition of the alignment film is not facilitated. Thus, the reaction rate is not increased.

Since ozone can effectively facilitate the reaction as compared with oxygen, the concentration of ozone is extremely lower than the concentration of oxygen to be supplied to the irradiated portion of the alignment film. If both the oxygen gas and the ozone gas are introduced, the concentrations thereof can be reduced for attaining the same effects.

In this invention, the step of irradiating the alignment film with light can be performed at any time after the formation of the alignment film. Specifically, the irradiation step can be performed after the application of alignment film, after the presintering, after the rubbing treatment, or after the cleaning of the substrate after the rubbing treatment. Also, it is possible to perform the irradiation step after the substrates are attached to each other. However, in such a case, the alignment film is irradiated with light through the counter substrate, so that it is necessary to use light having a wavelength capable of being transmitted through the substrate (e.g., glass).

As a mask which can be used in this invention, for example, a mask similar to a photomask which is usually used in a photolithography technique can be used. Although the alignment film is contaminated, it is possible to adopt a method in which a mask pattern is directly formed on the alignment film using a photolithography technique, the light irradiation is performed, and then the mask is peeled off. Alternatively, by using the converged light, a predetermined region may be selectively irradiated.

When the alignment film is irradiated with light, the light blocking portion is not required to completely block the light. It is sufficient to make a difference in transmittance between the blocking portion and the non-blocking portion. For example, a material having two or more regions with different transmittances is provided on the substrate as the mask. In this way, two or more types of regions with different alignments can be formed in one and the same liquid crystal layer.

Figure 16:
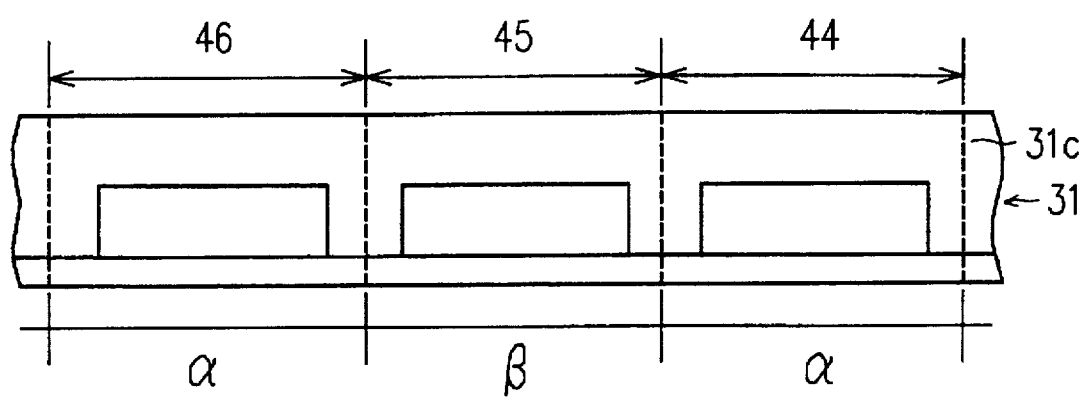
FIG. 16 is a cross-sectional view showing a LCD produced according to Example 7.

In this example, two regions X and Y having different pretilt angles on one substrate are formed in one picture element. The present invention is not limited to this specific setting. For example, as shown in FIG. 16, adjacent picture elements may be set to have different pretilt angles from each other. In this figure, in picture elements 44 and 46 which are not irradiated with light, the pretilt angle is set to be α, and in the picture element 45 which is irradiated with light, the pretilt angle is set to be β which is different from α.

According to the invention, three or more regions having different pretilt angles on one substrate can be formed in one picture element. Alternatively, a set of two or more picture elements is made to have the same pretilt angle, and the pretilt angles are made different between the sets of two or more picture elements. A construction in which three regions having different pretilt angles are formed in one picture elements can effectively used for an LCD which performs a color display.

The size of each of the regions X and Y is set to correspond to the size of one picture element, and the regions X and Y can alternately be formed, as shown in FIG. 19.

In the above example, the alignment film is irradiated with ultraviolet rays. It is appreciated that visible rays or infrared rays can alternatively be used. Especially when high energy can be easily used for changing the aligning conditions, it is preferred that the ultraviolet rays with wavelengths of 400 nm or less are used. The light having the wavelength can be surely obtained by using, for example, a high pressure mercury lamp. When the alignment film is irradiated with the ultraviolet rays (UV rays), it is preferred that the irradiation is performed under conditions from 1,000 (mJ/cm$^2$) to 10,000 (mJ/cm$^2$). As for other available light, a laser beam having the same range of wavelengths as those of ultraviolet rays, visible rays or infrared rays can be used. When the laser beams are used, the above effects can be attained in a shorter time period because the energy of a laser is added to the energy of light wavelength. Instead of the above light irradiation process, the aligning conditions of the alignment film can be changed locally by another energy beam irradiation. For example, the irradiation of electron beams, ion beams, X-rays or the like can locally change the chemical structure of the alignment film.

In this example, the alignment film is made of a polyimide film, but may be made of other materials. Such materials include an organic polymer film containing polyamide, polystyrene, polyamideimide, epoxyacrylate, spiranacrylate, or polyurethane as a main component, an inorganic oxide film, an inorganic nitride film, an inorganic fluoride film, and a metal film. In such a case, the irradiation light is preferred to be appropriately selected based on the selected kind of material. Alternatively, the alignment film may be formed of an inorganic material containing silicon nitride, silicon oxide, magnesium fluoride, gold or the like as the main component. In such a case, it is necessary to perform the irradiation of light with high energy such as ultraviolet laser beams, electron beams, or the like.

The present invention can improve the viewing performance in the TN mode and the STN mode. For example, in the case where an LCD of TN mode type is disposed between a pair of polarizing plates, in order to improve the viewing performance by eliminating the inversion phenomenon of LCD and the like, it is considered that the refractive indices of the liquid crystal molecules in the vertical direction (in the perpendicular direction with respect to the viewer) are preferably set equal to each other regardless of the viewing angle. That is, in the positive viewing direction, it is sufficient to suppress the change of anisotropy (Δn) of the refractive index in the vertical direction from large to 0 and then to large (in the reverse direction), as the viewing angle is made deeper from the position directly above the LCD (in the direction perpendicular to the substrate face).

Moreover, the production method according to the invention can be applied to a scattering mode LCD. When the method is applied to the scattering mode LCD, a plurality of different aligning conditions are formed for respective minute areas, so that the light incident on the liquid crystal layer is scattered when no voltage is applied to the liquid crystal layer because the aligning angles of liquid crystal molecules are different from each other for respective minute areas. When a voltage is gradually applied to the liquid crystal layer, the liquid crystal molecules gradually stand, so the liquid crystal layer transmits the incident light. As described above, based on the voltage applied to the liquid crystal layer, it is possible to perform the light switching operation.

In this example, the present invention is applied to a simple matrix type LCD. The invention is not limited to this specific type. Alternatively, the present invention can also be applied to any LCD of an active matrix type, or other types.

EXAMPLE 8

Examples 8 and 9 describe methods for precisely producing essential portions of the LCD according to the invention.

Figure 17:
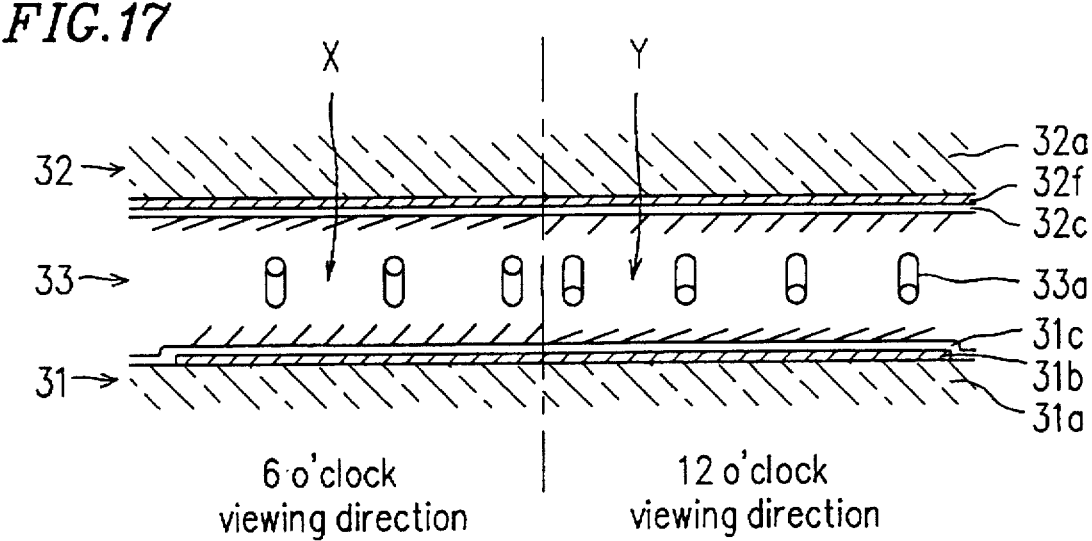
FIG. 17 is a cross-sectional view showing an active matrix type LCD to which the present invention is applied.

FIG. 17 is a cross-sectional view showing a simple matrix type LCD to which the present invention is applied. In the LCD, a pair of substrates 31 and 32 are disposed so as to face each other with a liquid crystal layer 33 sandwiched therebetween. In the substrate 31 which is the lower one of the substrates, an electrode layer 31b is formed on a base substrate 31a made of glass, silicon wafer, or the like. On the side which is in contact with the liquid crystal layer 33, an alignment film 31c for defining the alignment of liquid crystal molecules is formed. The electrode layer 31b provided on the substrate 31 is formed in such a manner that a plurality of strip electrodes are juxtaposed.

In the other (upper) substrate 32, an electrode layer 32f is formed on a base substrate 32a made of glass, silicon wafer, or the like. On the side which is in contact with the liquid crystal layer 33, an alignment film 32c for defining the alignment of liquid crystal molecules is formed. The electrode layer 32f provided on the substrate 32 is formed so as to cross the electrode layer 31b on the substrate 31, in such a manner that a plurality of strip electrodes are juxtaposed. The crossing portions of the electrode layers 31b and 32f constitute picture elements.

In the liquid crystal layer 33, regions X and Y in which the aligning conditions are different from each other are formed in one picture element. In the region X, the reference viewing direction is set in the 6 o'clock direction. In the region Y, the reference viewing direction is set in the 12 o'clock direction. In FIG. 17, short lines extending from the alignment films 31c and 32c represent the liquid crystal molecules which are in contact with the alignment films 31c and 32c. The tilting of the liquid crystal molecule 33a in the vicinity of the middle position along the thickness direction of the liquid crystal layer 33 indicates the average pretilting direction of the liquid crystal molecules.

The substrates 31 and 32 are sealed at their ends by a resin or the like, and a peripheral circuit such as a driving circuit is externally mounted on the periphery of a display section which performs a display in one of the substrates 31 and 32.

The method for producing the LCD having the above-described construction will be described below.

First, the electrode layers 31b and 32f are formed on the base substrates 31a and 32a by a known method, and the alignment films 31c and 32c are formed thereon. Thereafter, the alignment films 31c and 32c are unidirectionally rubbed with a burnishing cloth or the like.

Figure 18:
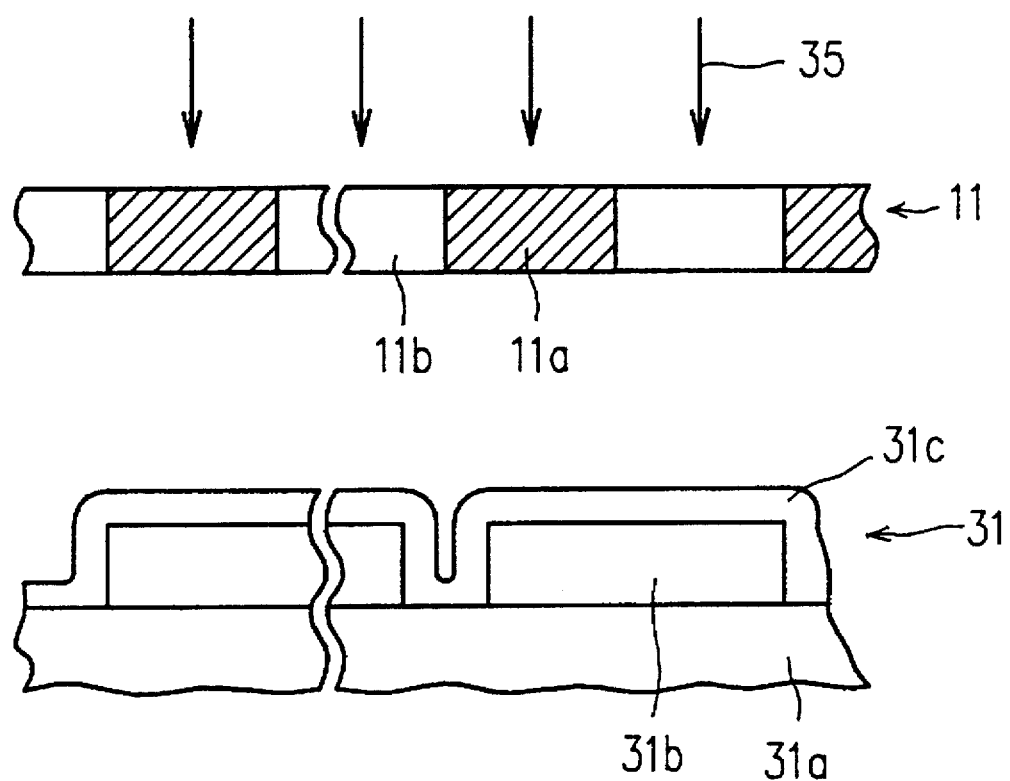
FIG. 18 is a cross-sectional view schematically showing a light irradiation process in a method for producing an LCD according to Example 8 of the invention.

Next, one of the substrates 31 and 32, e.g., the substrate 31 is located in a chamber (not shown) so that the alignment film 31c faces up. On the alignment film 31c, a mask 11 having light blocking portions 11a and light transmitting portions 11b is disposed. As shown in FIG. 18, the mask 11 has a construction in which the light blocking portions 11a are formed entirely and the light transmitting portions 11b are formed therein in a matrix. The mask 11 is disposed in such a manner that the light blocking portion 11a is positioned on a region corresponding to the region X of the electrode layer 31b which constitutes one picture element.

Next, a gas containing nitrogen of 85% in volume is introduced into the chamber. The gas is substituted for the atmosphere in the chamber. Thereafter, the alignment film 31c is irradiated with light 35 through the mask 11 from above. As for the light 35, ultraviolet rays can be used. As the result of the light irradiation, the irradiated portion of the alignment film 31c has a surface condition in which the pretilt angle of liquid crystal molecules is decreased.

Accordingly, in the irradiated alignment film 31c, the irradiated portion corresponding to the region Y has a smaller pretilt angle, and the non-irradiated portion corresponding to the region X has a larger pretilt angle.

Next, the other substrate 32 is located in the chamber, and the light irradiation is performed in the same manner as described above. At this time, the light blocking portion 11a is positioned over the area corresponding to the region Y. As the result of the light irradiation, in the alignment film 32c, the irradiated portion corresponding to the region X has a smaller pretilt angle, and the non-irradiated portion corresponding to the region Y has a larger pretilt angle. The light irradiation step for the substrate 32 may be performed prior to the light irradiation step for the substrate 31.

Then, the substrates 31 and 32 are attached to each other in such a manner that the alignment films 31c and 32c face inside. At this time, the substrates 31 and 32 are sealed at their ends. Thereafter, liquid crystal is injected into the gap between the substrates 31 and 32, so as to obtain the liquid crystal layer 33.

In the final step, a peripheral circuit such as a driving circuit is mounted on the periphery outside of the display section which performs a display. Thus, the LCD of this example is completed.

As described above, in this example, the alignment film is irradiated with light in an atmosphere containing nitrogen of 85% in volume. As a result, the volume ratio of oxygen to the air can be reduced from 20% (in the usual state) to 15%, so that the influence of oxygen on the light blocking portion can be suppressed. At this time, the reaction rate is not reduced. The irradiation amount of ultraviolet rays required for setting the initial pretilt angle from 5 to 0 degrees is about 10 J/cm$^2$.

The present invention can be performed if the mixing ratio of an inert gas is 100%. In such a case, there is no influence on the light blocking portion, and the reaction rate is reduced to be about ⅕. In addition, the required irradiation amount of ultraviolet rays is 50 J/cm$^2$ or more.

In this example, nitrogen is used as the inert gas. The invention is not limited to nitrogen, and alternatively, helium, neon, or argon can be used. In such a case, the mixing ratio is set to be the same as in the case of nitrogen.

In this example, the irradiation light for the alignment film is the ultraviolet rays. Alternatively, ultraviolet laser light can be used. In order to easily obtain a high energy, it is preferred that the ultraviolet rays with wavelengths of 400 nm or less are used. The light having the wavelength can be surely obtained by using a high pressure mercury lamp, a low pressure mercury lamp, a mercury xenon lamp, and the like.

EXAMPLE 9

In Example 9, the amount of oxygen is reduced as in Example 8, by reducing the pressure around the surface of the alignment film when the light irradiation is performed.

In this example, the substrates having the same construction as in Example 8 were used. Specifically, one of the substrates 31 and 32 was located in a chamber in which the internal pressure was adjusted to be 0.5 atm. Then, a mask was disposed. In this state, a predetermined portion of the alignment film was irradiated with ultraviolet rays. Instead of ultraviolet rays, laser light having the same wavelength range as that of the ultraviolet rays can be used.

In the case of this example, the degree of influence on the light blocking portion is substantially the same as that in the case where the volume ratio of an inert gas is 85% in Example 8. The reaction speed is somewhat improved, and the irradiation amount of ultraviolet rays required for changing the initial pretilt angle from 5 to 0 degrees is about 9 J/cm$^2$. Moreover, in the case of this example, the irradiation condition is selected to be a reduced pressure or vacuum, so that the light which may absorbed or scattered in the gas can reach the alignment film surface. Thus, the irradiation efficiency is increased, and the throughput can be shortened.

In this example, the pressure in the chamber can be reduced so as to be vacuum. In such a case, there is no influence on the light blocking portion. The reaction rate is slightly improved as compared with the case where the inert gas of 100% is used in Example 8. The required irradiation amount of ultraviolet rays is about 45 J/cm$^2$. The change in reaction rate is caused due to the degree of scattering of light by the gas.

As described above, in this example, the light irradiation is performed at a reduced pressure or in a vacuum, so that the absorption and scattering of light by the gas in the atmosphere can be suppressed. Therefore, the light attenuation degree can be reduced. Therefore, in this example, other than the ultraviolet rays and the laser light having the same wavelength range as that of the ultraviolet rays, visible rays, infrared rays, or laser light having the same wavelength range as that of such rays can be employed.

The alignment film which can be used in Examples 8 and 9 may be formed of a polyimide film. An alignment film made of other materials can also be used. An alignment film made of an inorganic material containing silicon nitride, silicon oxide, magnesium fluoride, gold or the like as the main component can be used. In such a case, it is necessary to perform the irradiation of light with high energy such as ultraviolet laser beams, or the like.

The present invention can be applied to a simple matrix type LCD, in addition to the abovedescribed active matrix type LCD.

In this invention, the step of irradiating the alignment film with light can be performed at any time after the formation of the alignment film. Specifically, the irradiation step can be performed after the application of alignment film, after the presintering, after the sintering, after the rubbing treatment, or after the cleaning of the substrate after the rubbing treatment.

As to a mask which can be used in this invention, it is possible to adopt a method in which a mask pattern is directly formed on the alignment film using a photolithography technique, the light irradiation is performed, and then the mask is peeled off. Alternatively, by using the converged light, a predetermined region may be selectively irradiated.

In Examples 8 and 9, it is possible to set the size of each of the regions X and Y corresponding to the size of one picture element as in Example 7, and the regions X and Y are alternately formed as shown in FIG. 19. In such a case, in each of the alignment films 31c and 32c, the irradiated portion and the non-irradiated portion are alternately formed, and each of the portions corresponds to one picture element.

As described above, according to the invention, different aligning conditions can be attained by differentiating the pretilt angles for every predetermined region. Accordingly, it is possible to form different reference orientation directions in one liquid crystal panel, so that the viewing characteristics in the different reference viewing directions can be mixedly obtained. Thus, the viewing performance and the display quality can be improved, and a wide viewing angle can be attained.

According to the invention, the dependence on viewing angle of the LCD can be eliminated, and the disadvantageous phenomenon that one aligning condition is absorbed by another aligning condition can be suppressed. In addition, the occurrence of disclination line at the boundary between regions with different aligning conditions can be suppressed. Moreover, in the case where the light blocking film is formed, the light leaked from the disclination line, if any, can be blocked. Therefore, according to the invention, it is possible to provide an LCD with reliability and improved display quality.

According to the method for producing an LCD of the invention, ozone or oxygen is introduced into the vicinity of the alignment film when the film is irradiated with light. Thus, the reaction rate at the surface of the alignment film can be increased, and the LCD can be produced with good producibility.

According to the invention, the influence on the light blocking portion during the light irradiation can be suppressed, so that the margin for irradiation conditions is widened. Thus, the control of the pretilt angles can be stably performed. In the cases where light other than ultraviolet rays is used, the light irradiation can be efficiently performed according to the invention, and the LCD having a wide viewing angle can be easily provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer, wherein the liquid crystal layer includes two or more liquid crystal layer regions of different aligning conditions, and at least one of the alignment films has surface tensions which are different from each other in surface regions thereof corresponding to the respective liquid crystal layer regions of different alignment conditions, and wherein in the surface regions having a larger surface tension, a pretilt angle of liquid crystal is set to be small, and in the surface regions having a smaller surface tension, a pretilt angle of liquid crystal is set to be large.

2. A liquid crystal display apparatus according to claim 1, wherein each of the surface regions having different surface tensions of the at least one of the alignment films is formed in a corresponding one of picture elements which are disposed in a matrix.

3. A liquid crystal display apparatus according to claim 1, wherein the surface regions having a larger surface tension and the surface regions having a smaller surface tension are arranged alternately on both of the alignment films, and the surface regions having a larger surface tension on one of the alignment films face the surface regions having a smaller tension on the other of the alignment films.

4. A liquid crystal display apparatus according to claim 1, wherein each of the alignment films is made of an organic polymer material containing at least one of polyimide, polyamide, polystyrene, polyamideimide, epoxyacrylate, spiranacrylate, and polyurethane as a main component.

5. A liquid crystal display apparatus according to claim 1, wherein the two or more liquid crystal layer regions having different aligning conditions are formed in each of picture elements in a band-like shape, and a boundary between one liquid crystal layer region and a liquid crystal layer region adjacent thereto is parallel to an aligning direction of liquid crystal molecules which are in contact with one of the pair of substrates.

6. A liquid crystal display apparatus according to claim 5, further comprising signal lines disposed in the vicinity of the respective picture elements and nonlinear elements for connecting the picture elements to the signal lines, wherein positions of the nonlinear elements or the aligning conditions in the liquid crystal layer regions having different aligning conditions are determined so that the boundary is located most remotely from the nonlinear element.

7. A liquid crystal display apparatus according to claim 1, wherein the two or more liquid crystal layer regions having different aligning conditions are formed in each of picture elements, and a boundary between adjacent liquid crystal layer regions is covered with a light blocking film.

8. A liquid crystal display apparatus according to claim 1, wherein a boundary between one liquid crystal layer region and a liquid crystal layer region adjacent thereto is covered with a light blocking film.

9. A liquid crystal display apparatus according to claim 1, wherein the difference between the larger surface tension and the smaller surface tension is approximately 2 dyn/cm or more.

10. A liquid crystal display apparatus according to claim 1, wherein the optical transmittance of the two or more liquid crystal layer regions is selectively varied to conduct display.

11. A liquid crystal display apparatus according to claim 1, wherein the two or more liquid crystal layer regions having different aligning conditions are formed in each of picture elements in a band-like shape, and a boundary between one liquid crystal layer region and a liquid crystal layer region adjacent thereto is continuously extended over two or more picture elements.

12. A liquid crystal display apparatus comprising a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer, wherein the liquid crystal layer includes two or more liquid crystal layer regions of different aligning conditions, and at least one of the alignment films has oxygen atom concentrations which are different from each other in surface regions thereof corresponding to the respective liquid crystal layer regions of different aligning conditions, and wherein in the surface regions having a higher oxygen atom concentrating, a pretilt angle of liquid crystal is set to be small, and in the surface regions having a lower oxygen atom concentration, a pretilt angle of liquid crystal is set to be large.

13. A liquid crystal display apparatus according to claim 12, wherein each of the surface regions having different oxygen atom concentrations of the at least one of the alignment films is formed in a corresponding one of picture elements which are disposed in a matrix.

14. A liquid crystal display apparatus according to claim 12, wherein the surface regions having a higher oxygen atom concentration and the surface regions having a lower oxygen concentration are arranged alternately on both of the alignment films, and the surface regions having a higher oxygen atom concentration on one of the alignment films face the surface regions having a lower oxygen atom concentration on the other of the alignment films.

15. A liquid crystal display apparatus according to claim 12, wherein each of the alignment films is made of an organic polymer material containing at least one of polyimide, polyamide, polystyrene, polyamideimide, epoxyacrylate, spiranacrylate, and polyurethane as a main component.

16. A liquid crystal display apparatus according to claim 12, wherein the two or more liquid crystal layer regions having different aligning conditions are formed in each of picture elements in a band-like shape, and a boundary between one liquid crystal layer region and a liquid crystal layer region adjacent thereto is continuously extended over two or more picture elements.

17. A liquid crystal display apparatus according to claim 12, wherein the two or more liquid crystal layer regions having different aligning conditions are formed in each of picture elements in a band-like shape, and a boundary between one liquid crystal layer region and a liquid crystal layer region adjacent thereto is parallel to an aligning direction of liquid crystal molecules which are in contact with one of the pair of substrates.

18. A liquid crystal display apparatus according to claim 17, further comprising signal lines disposed in the vicinity of the respective picture elements and nonlinear elements for connecting the picture elements to the signal lines, wherein positions of the nonlinear elements or the aligning conditions in the liquid crystal layer regions having different aligning conditions are determined so that the boundary is located most remotely from the nonlinear element.

19. A liquid crystal display apparatus according to claim 12, wherein the two or more liquid crystal layer regions having different aligning conditions are formed in each of picture elements, and a boundary between adjacent liquid crystal layer regions is covered with a flight blocking film.

20. A liquid crystal display apparatus according to claim 12, wherein a boundary between one liquid crystal layer region and a liquid crystal layer region adjacent thereto is covered with a light blocking film.

21. A liquid crystal display apparatus according to claim 12, further comprising nonlinear elements connected to the respective picture elements, and a light blocking film which is made of the same material as that of an opaque layer constituting the nonlinear elements.

22. A liquid crystal display apparatus according to claim 12, wherein the atomic percent of the lower oxygen atom concentration is approximately 70% or less of that of the higher oxygen atom concentration.

23. A liquid crystal display apparatus according to claim 12, wherein the optical transmittance of the two or more liquid crystal layer regions is selectively varied to conduct display.

24. A liquid crystal display apparatus comprising a pair of substrates and a liquid crystal layer sandwiched between the pair of substrates with alignment films formed at interfaces between the liquid crystal layer and the respective substrates, the alignment films regulating aligning conditions of liquid crystal in the liquid crystal layer,
wherein the liquid crystal layer includes two or more liquid crystal layer regions of different aligning conditions, and at least one of the alignment films has carbonyl radical concentrations which are different from each other in surface regions thereof corresponding to the respective liquid crystal layer regions of different alignment conditions, and
wherein in the surface regions having a higher carbonyl radical concentration, a pretilt angle of liquid crystal is set to be small, and in the surface regions having a lower carbonyl radical concentration, a pretilt angle of liquid crystal is set to be large.

25. A liquid crystal display apparatus according to claim 24, wherein each of the surface regions having different carbonyl radical concentrations of the at least one of the alignment films is formed in a corresponding one of picture elements which are disposed in a matrix.

26. A liquid crystal display apparatus according to claim 24, wherein the surface regions having a higher carbonyl radical concentration and the surface regions having a lower carbonyl radical concentration are arranged alternately on both of the alignment films, and the surface regions having a higher carbonyl radical concentration on one of the alignment films face the surface regions having a lower carbonyl radical concentration on the other of the alignment films.

27. A liquid crystal display apparatus according to claim 24, wherein each of the alignment films is made of an organic polymer material containing at least one of polyimide, polyamide, polystyrene, polyamideimide, epoxyacrylate, spiranacrylate, and polyurethane as a main component.

28. A liquid crystal display apparatus according to claim 24, wherein the two or more liquid crystal layer regions having different aligning conditions are formed in each of picture elements in a band-like shape, and a boundary between one liquid crystal layer region and a liquid crystal layer region adjacent thereto is parallel to an aligning direction of liquid crystal molecules which are in contact with one of the pair of substrates.

29. A liquid crystal display apparatus according to claim 28, further comprising signal lines disposed in the vicinity of the respective picture elements and nonlinear elements for connecting the picture elements to the signal lines, wherein positions of the nonlinear elements or the aligning conditions in the liquid crystal layer regions having different aligning conditions are determined so that the boundary is located most remotely from the nonlinear element.

30. A liquid crystal display apparatus according to claim 24, wherein the two or more liquid crystal layer regions having different aligning conditions are formed in each of picture elements, and a boundary between adjacent liquid crystal layer regions is covered with a light blocking film.

31. A liquid crystal display apparatus according to claim 24, wherein a boundary between one liquid crystal layer region and a liquid crystal layer region adjacent thereto is covered with a light blocking film.

32. A liquid crystal display apparatus according to claim 24, wherein, in the vicinity of the 1700 $cm^{-1}$ in a spectrum of FTIR measurement, the surface regions having the higher carbonyl radical concentration have a peak, while the surface regions having the lower carbonyl radical concentration have no peak.

33. A liquid crystal display apparatus according to claim 24, wherein the optical transmittance of the two or more liquid crystal layer regions is selectively varied to conduct display.

34. A liquid crystal display apparatus according to claim 24, wherein the two or more liquid crystal layer regions having different aligning conditions are formed in each of picture elements in a band-like shape, and a boundary between one liquid crystal layer region and a liquid crystal layer region adjacent thereto is continuously extended over two or more picture elements.

* * * * *